United States Patent
Zhu et al.

(10) Patent No.: US 12,004,264 B2
(45) Date of Patent: Jun. 4, 2024

(54) SESSION MANAGEMENT METHOD, DEVICE, AND SYSTEM

(71) Applicant: Huawei Technologies Co., Ltd., Shenzhen (CN)

(72) Inventors: Fenqin Zhu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/860,533

(22) Filed: Jul. 8, 2022

(65) Prior Publication Data

US 2022/0346190 A1   Oct. 27, 2022

Related U.S. Application Data

(63) Continuation of application No. 16/906,842, filed on Jun. 19, 2020, now Pat. No. 11,432,366, which is a
(Continued)

(30) Foreign Application Priority Data

Jan. 12, 2018  (CN) .......................... 201810031226.6
Apr. 9, 2018   (CN) .......................... 201810313129.6
Nov. 19, 2018  (CN) .......................... 201811379260.9

(51) Int. Cl.
*H04W 80/10* (2009.01)
*H04M 15/00* (2006.01)
(Continued)

(52) U.S. Cl.
CPC ........... *H04W 80/10* (2013.01); *H04M 15/66* (2013.01); *H04W 40/20* (2013.01);
(Continued)

(58) Field of Classification Search
CPC ............. H04M 15/66; H04M 15/8033; H04M 15/8038; H04M 15/8044; H04M 15/8228;
(Continued)

(56) References Cited

U.S. PATENT DOCUMENTS 10,863,412 B2   12/2020   Baek et al.
2003/0135626 A1  7/2003   Ray et al.
(Continued)

FOREIGN PATENT DOCUMENTS

CN   101296225 A   10/2008
CN   107105399 A    8/2017
(Continued)

OTHER PUBLICATIONS

Nokia et al., "TS 23.501: SMF management due to far mobility," SA WG2 Meeting #S2-121, S2-173886, May 29-Jun. 2, 2017, Hangzhou, China, 7 pages.
(Continued)

*Primary Examiner* — Joseph Arevalo
(74) *Attorney, Agent, or Firm* — Conley Rose, P.C.

(57) ABSTRACT

A session management method, device, and system, such that a terminal can access a local data network using a local user plane function (UPF) network element even when the terminal is out of a management area of a remote anchor session management function (SMF) network element. The method includes: receiving, by an intermediate session management network element, one or more local data network access identifiers (DNAIs); and determining, by the intermediate session management network element, a target DNAI based on current location information of a terminal and the one or more local DNAIs, where the target DNAI is used to select a local session management network element for the terminal.

22 Claims, 12 Drawing Sheets

Related U.S. Application Data continuation of application No. PCT/CN2018/119736, filed on Dec. 7, 2018.

(51) Int. Cl.
| | |
|---|---|
| *H04W 40/20* | (2009.01) |
| *H04W 60/00* | (2009.01) |
| *H04W 64/00* | (2009.01) |
| *H04W 76/11* | (2018.01) |

(52) U.S. Cl.
CPC ......... *H04W 60/005* (2013.01); *H04W 64/00* (2013.01); *H04W 76/11* (2018.02)

(58) Field of Classification Search
CPC ... H04W 40/20; H04W 60/005; H04W 64/00; H04W 76/11; H04W 76/12; H04W 76/22; H04W 76/32; H04W 8/12; H04W 80/10; H04W 36/12; H04W 4/24; H04W 8/065
USPC .................. 370/329, 312, 331, 235, 328
See application file for complete search history.

(56) References Cited

U.S. PATENT DOCUMENTS

| | | | |
|---|---|---|---|
| 2017/0289270 A1 | 10/2017 | Li et al. | |
| 2019/0059067 A1* | 2/2019 | Lee | H04W 28/10 |
| 2019/0253917 A1* | 8/2019 | Dao | H04L 12/1407 |
| 2019/0297121 A1* | 9/2019 | Qiao | H04L 65/1016 |
| 2019/0306251 A1* | 10/2019 | Talebi Fard | H04W 76/10 |
| 2019/0313468 A1* | 10/2019 | Talebi Fard | H04W 76/12 |
| 2019/0335392 A1* | 10/2019 | Qiao | H04W 48/18 |

FOREIGN PATENT DOCUMENTS

| | | |
|---|---|---|
| WO | 2017219973 A1 | 12/2017 |
| WO | 2019192417 A1 | 10/2019 |

OTHER PUBLICATIONS

S2-174193, Ericsson, "SMF Service Areas", SA WG2 Meeting #122, Jun. 26-30, 2017, San Jose Del Cabo, Mexico, 17 pages.

3GPP TS 23.501 V15.0.0, "3rd Generation Partnership Project; Technical Specification Group Services and System Aspects; System Architecture for the 5G System; Stage 2 (Release 15)," Dec. 2017, 181 pages.

S2-171870, Huawei, HiSilicon, "TS 23.501: Relation between the SMF and UPF", SA WG2 Meeting #120, Mar. 27-31, 2017, Busan, Korea, 8 pages.

S2-176549, NTT DOCOMO., "23.501: AF subscription to DNAI change events and concept of DNAI service area ", SA WG2 Meeting #122bis, Aug. 21-25, 2017, Sofia Antipolis, France, 5 pages.

S2-173006, Ericsson, "23.501: SMF Service Areas," SA WG2 Meeting #121, May 15-19, 2017, Hangzhou, China, 13 pages.

S2-176477, NTT DOCOMO, et al., "23.501: AF subscription to DNAI change events and concept of DNAI service area," SA WG2 Meeting #122bis, Aug. 21-25, 2017, Sofia Antipolis, France, 5 pages.

3GPP TS 23.502, V15.0.0, "3rd Generation Partnership Project; Technical Specification Group Services and System Aspects; Procedures for the 5G System; Stage 2 (Release 15)," Dec. 2017, 258 pages.

3GPP TS 29.244 V15.0.0, "3rd Generation Partnership Project; Technical Specification Group Core Network and Terminals; Interface between the Control Plane and the User Plane Nodes;Stage 3 (Release 15)," Dec. 2017, 157 pages.

Nokia, et al., "TS 23.501: SMF management due to far mobility," 3GPP Draft; S2-174044, May 20, 2017, XP051289511, 7 pages.

Nokia, et al., "23.501 5.6.7: Application Function influence on traffic routing (location information and corrections)," 3GPP Draft; S2-172863, Mar. 27-31, 2017, XP051258276, 7 pages.

Ericsson: "SMF Service Areas," 3GPP Draft; S2-174193, Jun. 26-30, 2017, XP051303048, 17 pages.

"3rd Generation Partnership Project; Technical Specification Group Services and System Aspects; System Architecture for the 5G System; Stage 2 (Release 15)", 3GPP TS 23.501 V15.0.0, Dec. 22, 2017, pp. 1-181, XP055623209.

Huawei et al., "UL-CL insertion when ULCL is in different region comparing to A-SMF," 3GPP Draft; S2-187019, Jul. 2-6, 2018, XP051538468, 7 pages.

\* cited by examiner

SESSION MANAGEMENT METHOD, DEVICE, AND SYSTEM

CROSS-REFERENCE TO RELATED APPLICATIONS

This is a continuation of U.S. patent application Ser. No. 16/906,842 filed on Jun. 19, 2020, which is a continuation of Int'l Patent App. No. PCT/CN2018/119736 filed on Dec. 7, 2018, which claims priority to Chinese Patent App. No. 201810031226.6 filed on Jan. 12, 2018, Chinese Patent App. No. 201810313129.6 filed on Apr. 9, 2018, and Chinese Patent App. No. 201811379260.9 filed on Nov. 19, 2018, all of which are incorporated by reference.

FIELD

This application relates to the field of communications technologies, and in particular, to a session management method, device, and system.

BACKGROUND

In an existing 5th generation (5G) network architecture, one protocol data unit (PDU) session is managed by one session management function (SMF) network element. This means that in the existing 5G network architecture, when a terminal is in a non-roaming state, all user plane function (UPF) network elements on a user plane path of a PDU session of the terminal are controlled by one SMF network element. For example, the PDU session of the terminal corresponds to two UPF network elements. One UPF network element is located nearby an access device of the terminal, and the other UPF network element is located in a central equipment room. In this case, the SMF network element that manages the PDU session of the terminal needs to control the two UPF network elements at different locations.

However, the foregoing 5G network architecture is inconsistent with actual deployment of an operator. In actual deployment of the operator, considering complexity of configuration in different administrative regions and a desire of the operator to hide a network topology, usually, SMF network elements and UPF network elements are deployed based on administrative regions. An SMF network element serving an administrative region can manage only a UPF network element serving the administrative region, and cannot manage a UPF network element serving another administrative region. In addition, a UPF network element serving some special areas in the administrative region cannot be managed by a general SMF network element serving the administrative region. In this case, how to perform session management to enable the terminal to access a local data network using a local UPF network element even when the terminal is out of a management area of a remote anchor SMF network element is a current research focus.

SUMMARY

Embodiments of this application provide a session management method, device, and system, such that a terminal can access a local data network using a local UPF network element even when the terminal is out of a management area of a remote anchor SMF network element.

To achieve the foregoing objective, the following technical solutions are used in the embodiments of this application.

According to a first aspect, a session management method is provided, where the method includes: receiving, by an intermediate session management network element, one or more local data network access identifiers (DNAIs); and determining, by the intermediate session management network element, a target DNAI based on current location information of a terminal and the one or more local DNAIs, where the target DNAI is used to select a local session management network element for the terminal. Based on this solution, the intermediate session management network element may determine the target DNAI based on the current location information of the terminal and the obtained one or more local DNAIs, where the target DNAI is used to select the local session management network element for the terminal, and the local session management network element may manage a local user plane function network element serving the terminal. Therefore, the terminal can access a local data network using the local user plane function network element even if when the terminal is out of a management area of a remote anchor session management network element.

In a possible design, after determining, by the intermediate session management network element, a target DNAI, the method further includes sending, by the intermediate session management network element, a first message to a mobility management network element, where the first message carries the target DNAI. Based on this solution, the mobility management network element may determine the local session management network element serving the terminal.

Optionally, the target DNAI is further used to select the local user plane function network element for the terminal.

Optionally, the first message further carries information about a session access mode, and the information about the session access mode is used to determine an access mode of a local session.

Optionally, the session access mode is further used to select at least one of the local user plane function network element or the local session management network element for the terminal.

Optionally, the session access mode includes an uplink (UL) classifier (ULCL) mode or a multi-homing mode.

In a possible design, the method further includes receiving, by the intermediate session management network element, application identification information corresponding to the one or more local DNAIs. Correspondingly, the first message further carries application identification information corresponding to the target DNAI, where the application identification information corresponding to the target DNAI is used to generate a local routing rule, and the local routing rule is used to offload data to a local data network corresponding to the target DNAI.

In a possible design, after sending, by the intermediate session management network element, a first message to a mobility management network element, the method further includes: receiving, by the intermediate session management network element, a second message from the mobility management network element, where the second message is used to notify to release session resources of the terminal on the intermediate session management network element and an intermediate user plane function network element; releasing, by the intermediate session management network element, a session resource of the terminal on the intermediate session management network element based on the second message; and sending, by the intermediate session management network element, a third message to the intermediate user plane function network element, where the third message is used to notify to release a session resource of the terminal on the intermediate user plane function network element. Based on this solution, storage space of the intermediate session management network element and the intermediate user plane function network element is not always occupied by session resources, such that a waste of storage resources on the intermediate session management network element and the intermediate user plane function network element is avoided. In addition, after the local user plane function network element is inserted into a session path, the intermediate session management network element and the intermediate user plane function network element on the original session path are replaced by the local session management network element that manages the local user plane function network element and the local user plane function network element respectively, such that a control plane path between the mobility management network element and the local session management network element can be made relatively short.

In a possible design, after determining, by the intermediate session management network element, a target DNAI, the method further includes determining, by the intermediate session management network element based on the target DNAI, the local session management network element serving the terminal. Based on this solution, the intermediate session management network element may determine the local session management network element serving the terminal.

In a possible design, determining, by the intermediate session management network element based on the target DNAI, the local session management network element serving the terminal includes selecting, by the intermediate session management network element, the local session management network element for the terminal based on the target DNAI and local configuration information.

In a possible design, determining, by the intermediate session management network element based on the target DNAI, the local session management network element serving the terminal includes: sending, by the intermediate session management network element, a fourth message to a network function repository network element, where the fourth message carries the target DNAI; and receiving, by the intermediate session management network element, information about the local session management network element from the network function repository network element.

In a possible design, determining, by the intermediate session management network element based on the target DNAI, the local session management network element serving the terminal includes selecting, by the intermediate session management network element, the local session management network element for the terminal based on the target DNAI and information about a session access mode.

In a possible design, determining, by the intermediate session management network element based on the target DNAI, the local session management network element serving the terminal includes: sending, by the intermediate session management network element, a fifth message to a mobility management network element, where the fifth message carries the target DNAI; and receiving, by the intermediate session management network element, information about the local session management network element from the mobility management network element.

In a possible design, the method further includes sending, by the intermediate session management network element, a sixth message to the local session management network element, where the sixth message carries the current location information of the terminal, and the current location information of the terminal is used to select a local user plane function network element for the terminal.

In a possible design, the sixth message further carries the information about the session access mode, and the session access mode information is used to determine an access mode of a local session.

In a possible design, the session access mode includes a ULCL mode, and the method further includes receiving, by the intermediate session management network element, application identification information corresponding to the one or more local DNAIs. Correspondingly, the sixth message further carries application identification information corresponding to the target DNAI, where the application identification information corresponding to the target DNAI is used to generate a local routing rule, and the local routing rule is used to offload data to a local data network corresponding to the target DNAI.

In another possible design, the session access mode includes a multi-homing mode, and the method further includes: sending, by the intermediate session management network element to a remote anchor session management network element, a local internet protocol (IP) address allocated by the local session management network element to the terminal, where the local IP address is sent to the terminal using the remote anchor session management network element; or sending, by the intermediate session management network element, a router advertisement to the terminal, where the router advertisement carries a local IP address allocated by the local session management network element to the terminal. Based on this solution, when the session access mode is the multi-homing mode, the terminal can obtain the local IP address.

In a possible design, the method further includes sending, by the intermediate session management network element, the target DNAI to the remote anchor session management network element, where the target DNAI is used to perform charging and policy control.

In a possible design, the method further includes sending, by the intermediate session management network element, a request message to the local session management network element, where the request message is used to establish a path between a current access device of the terminal and the local user plane function network element, and to establish a path between the local user plane function network element and a remote anchor user plane function network element. Based on this solution, a user plane path of a session can be established.

In a possible design, the method further includes sending, by the intermediate session management network element, a seventh message to an intermediate user plane function network element, where the seventh message is used to notify to release a session resource of the terminal on the intermediate user plane function network element.

Based on this solution, storage space of the intermediate user plane function network element is not always occupied by session resources, such that a waste of storage resources on the intermediate user plane function network element is avoided. In addition, after the local user plane function network element is inserted into a session path, the intermediate session management network element on the original session path is retained, and the intermediate user plane function network element is replaced by the local session management network element and the local user plane function network element. In this case, the local session management network element is equivalent to a simplified session management network element. To be more specific, the local session management network element supports some functions of a session management network element, for example, supports selection and control functions of a user plane function network element, and can interface with a previous level of session management network element, for example, the intermediate session management network element, and perform a corresponding operation or the like according to an notification of the intermediate session management network element, and does not directly interface with another control plane network element. In this way, a quantity of interfaces between the local session management network element and another control plane function can be reduced, an external network topology can be shielded, and an external network element does not need to perceive a local network topology, such that complexity of network configuration can be reduced.

According to a second aspect, an intermediate session management network element is provided, where the intermediate session management network element has a function of implementing the method according to any one of the foregoing first aspect or the following ninth aspect. The function may be implemented by hardware, or may be implemented by hardware executing corresponding software. The hardware or the software includes one or more modules corresponding to the function.

According to a third aspect, an intermediate session management network element is provided, including: a processor and a memory, where the memory is configured to store a computer executable instruction, and when the intermediate session management network element runs, the processor executes the computer executable instruction stored in the memory, such that the intermediate session management network element performs the session management method according to any one of the foregoing first aspect or the following ninth aspect.

According to a fourth aspect, an intermediate session management network element is provided, including: a processor configured such that after being coupled to a memory and reading an instruction from the memory, the processor performs, according to the instruction, the session management method according to any one of the foregoing first aspect or the following ninth aspect.

According to a fifth aspect, a computer-readable storage medium is provided, where the computer-readable storage medium stores an instruction, and when the instruction runs on a computer, the computer is enabled to perform the session management method according to any one of the foregoing first aspect or the following ninth aspect.

According to a sixth aspect, a computer program product including an instruction is provided, where when the computer program product runs on a computer, the computer is enabled to perform the session management method according to any one of the foregoing first aspect or the following ninth aspect.

For technical effects brought by any design manner of the second to the sixth aspects, refer to the technical effects brought by different design manners of the first aspect. Details are not described herein again.

According to a seventh aspect, a session management system is provided, where the session management system includes: an intermediate session management network element and a mobility management network element. The intermediate session management network element is configured to: receive one or more local data network access identifiers (DNAIs); determine a target DNAI based on current location information of a terminal and the one or more local DNAIs; and send a first message to the mobility management network element, where the first message carries the target DNAI. The mobility management network element is configured to receive the first message from the intermediate session management network element, and determine, based on the target DNAI, a local session management network element serving the terminal. Based on the session management system, the mobility management network element may determine, based on the target DNAI, the local session management network element serving the terminal, and the local session management network element may manage a local user plane function network element serving the terminal. Therefore, the terminal can access a local data network using the local user plane function network element even if when the terminal is out of a management area of a remote anchor session management network element.

In a possible design, the session management system includes the local session management network element, and the mobility management network element is further configured to send a second message to the local session management network element, where the second message carries the current location information of the terminal. Additionally, the local session management network element is configured to receive the second message from the mobility management network element, and determine, based on the current location information of the terminal, a local user plane function network element serving the terminal. Based on this solution, the local user plane function network element serving the terminal can be determined.

In a possible design, the second message further carries the target DNAI, and the local session management network element is further configured to send the target DNAI to a remote anchor session management network element, where the target DNAI is used to perform charging and policy control.

In a possible design, the first message further carries information about a session access mode, and correspondingly, the second message further carries the information about the session access mode, where the information about the session access mode is used to determine an access mode of a local session. Based on this manner, the local session management network element can obtain the information about the session access mode when there is no interface between the remote anchor session management network element and the local session management network element.

In a possible design, the local session management network element is further configured to receive information about a session access mode from the remote anchor session management network element, where the information about the session access mode is used to determine an access mode of a local session.

In a possible design, the session access mode includes a multi-homing mode, the local session management network element is further configured to allocate a local internet protocol (IP) address to the terminal, and the local session management network element is further configured to receive a remote IP address allocated by the remote anchor session management network element to the terminal. Additionally, the local session management network element is further configured to notify the local user plane function network element to offload data whose source address is the local IP address to a local data network corresponding to the target DNAI, and offload data whose source address is the remote IP address to a remote anchor user plane function network element. Based on this solution, data offloading of the local data network and a remote data network can be implemented when the session mode is the multi-homing mode.

In a possible design, the local session management network element is further configured to send the local IP address to the remote anchor session management network element, where the local IP address is sent to the terminal using the remote anchor session management network element. Alternatively, the local session management network element is further configured to send a router advertisement to the terminal, where the router advertisement carries the local IP address. Based on this solution, when the session access mode is the multi-homing mode, the terminal can obtain the local IP address.

In a possible design, the session access mode includes an uplink classifier (ULCL) mode, and the local session management network element is further configured to generate a local routing rule based on at least one of local configuration information or application identification information corresponding to the one or more local DNAIs. Additionally, the local session management network element is further configured to send the local routing rule to the local user plane function network element, where the local routing rule is used to offload data to a local data network corresponding to the target DNAI. Based on this solution, data offloading of the local data network can be implemented when the session mode is the ULCL mode.

In a possible design, the local session management network element is further configured to initiate establishment of a path between a current access device of the terminal and the local user plane function network element and a path between the local user plane function network element and the remote anchor user plane function network element. Based on this solution, a user plane path of a session can be established.

According to an eighth aspect, a session management system is provided, where the session management system includes: an intermediate session management network element and a local session management network element. The intermediate session management network element is configured to: receive one or more local data network access identifiers (DNAIs); determine a target DNAI based on current location information of a terminal and the one or more local DNAIs; determine, based on the target DNAI, the local session management network element serving the terminal; and send a first message to the local session management network element, where the first message carries the current location information of the terminal. The local session management network element is configured to receive the first message from the intermediate session management network element, and determine, based on the current location information of the terminal, a local user plane function network element serving the terminal. Based on the session management system, the intermediate session management network element may determine, based on the target DNAI, the local session management network element serving the terminal, and send, to the local session management network element, the first message that carries the current location information of the terminal, such that the local session management network element can select the local user plane function network element for the terminal based on the current location information of the terminal. Therefore, the terminal can access a local data network using the local user plane function network element even when the terminal is out of a management area of a remote anchor session management network element.

Optionally, the first message further carries information about a session access mode, and the information about the session access mode is used to determine an access mode of a local session.

According to a ninth aspect, a session management method is provided, where the method includes: receiving, by an intermediate session management network element, one or more local data network access identifiers (DNAIs); determining, by the intermediate session management network element, a target DNAI based on current location information of a terminal and the one or more local DNAIs; and selecting, by the intermediate session management network element, a local user plane function network element for the terminal based on the target DNAI.

In a possible design, the session management method provided in this embodiment of this application may further include: obtaining, by the intermediate session management network element, at least one of a session access mode, a remote internet protocol (IP) address, a local routing policy corresponding to the target DNAI, or application identification information corresponding to the target DNAI; and generating, by the intermediate session management network element, a target rule based on at least one of the session access mode, the remote IP address, the local routing policy corresponding to the target DNAI, or the application identification information corresponding to the target DNAI, where the target rule is used for the local user plane function network element to forward a received data packet.

In a possible design, the session management method provided in this embodiment of this application may further include obtaining, by the intermediate session management network element, information about the session access mode, where the information about the session access mode is used to determine an access mode of a local session.

In a possible design, the session access mode is further used to select the local user plane function network element for the terminal.

In a possible design, the session access mode includes an uplink classifier (ULCL) mode or a multi-homing mode.

In a possible design, the session management method provided in this embodiment of this application may further include: sending, by the intermediate session management network element, the target DNAI to a remote anchor session management network element, where the target DNAI is used to perform charging and policy control.

With reference to the first aspect or the ninth aspect, in a possible design, the one or more local DNAIs are a local DNAI supported by the intermediate session management network element in a policy and charging control (PCC) rule corresponding to a session of the terminal.

With reference to the first aspect or the ninth aspect, in a possible design, the one or more DNAIs are a local DNAI supported by the intermediate session management network element in a PCC rule corresponding to one or more service data flows detected by an anchor user plane function network element.

With reference to the first aspect or the ninth aspect, in a possible design, the session management method provided in this embodiment of this application may further include sending, by the intermediate session management network element, a request message to the remote anchor session management network element, where the request message is used to request the remote anchor session management network element to send, to the intermediate session management network element, the local DNAI supported by the intermediate session management network element in the PCC rule corresponding to the one or more service data flows detected by the anchor user plane function network element.

With reference to the first aspect or the ninth aspect, in a possible design, the request message includes information indicating one or more DNAIs supported by the intermediate session management network element.

With reference to the first aspect or the ninth aspect, in a possible design, receiving, by an intermediate session management network element, one or more local DNAIs includes receiving, by the intermediate session management network element, one or more local DNAIs from the remote anchor session management network element or a policy control network element.

These aspects or other aspects in this application may be clearer and more intelligible in descriptions in the following embodiments.

BRIEF DESCRIPTION OF THE DRAWINGS

To describe the technical solutions in the embodiments of this application more clearly, the following briefly describes the accompanying drawings required for describing the embodiments.

DETAILED DESCRIPTION

The following describes the technical solutions in the embodiments of this application with reference to the accompanying drawings in the embodiments of this application. In description of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in description of this application, "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In addition, network architectures and service scenarios described in the embodiments of this application are intended to more clearly describe the technical solutions in the embodiments of this application, but do not limit the technical solutions provided in the embodiments of this application. A person of ordinary skill in the art may know that as the network architectures evolve and a new service scenario emerges, the technical solutions provided in the embodiments of this application are also applicable to a similar technical problem.

First, a possible scenario to which the embodiments of this application are applicable is described as follows.

Figure 1A:
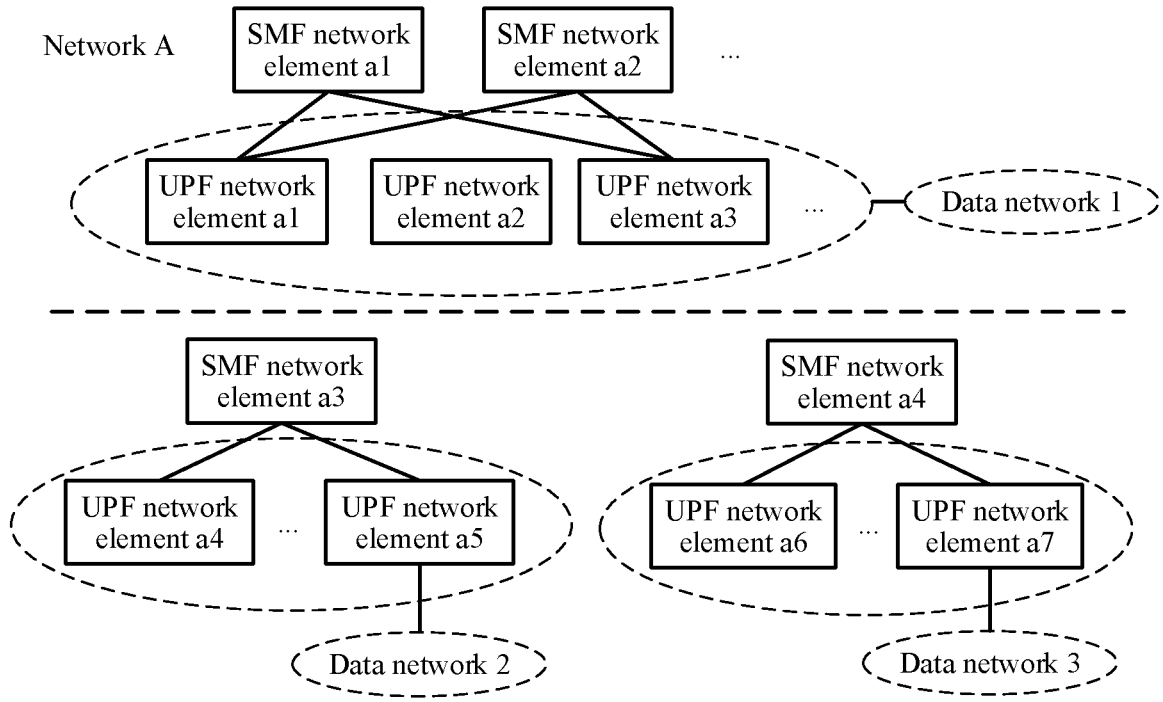
FIG. 1A and FIG. 1B are schematic diagrams of deployment of SMF network elements and UPF network elements that correspond to different networks according to an embodiment of this application.
Figure 1B:
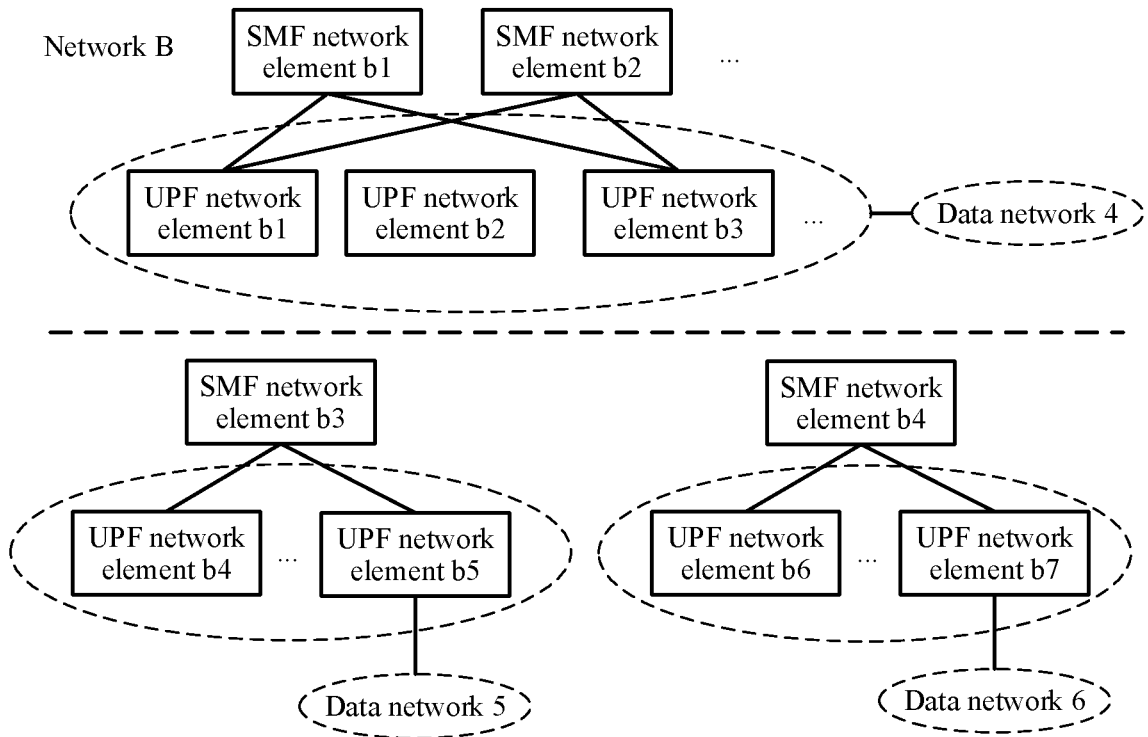

FIG. 1A and FIG. 1B are schematic diagrams of deployment of SMF network elements and UPF network elements that correspond to different networks. FIG. 1A is a schematic diagram of deployment of SMF network elements and UPF network elements that correspond to a network A. FIG. 1B is a schematic diagram of deployment of SMF network elements and UPF network elements that correspond to a network B. In FIG. 1A and FIG. 1B, general SMF network elements and general UPF network elements serving the network are above the dashed line. For example, an SMF network element a1 and an SMF network element a2 in the network A are general SMF network elements serving the network A, and a UPF network element a1, a UPF network element a2, and a UPF network element a3 in the network A are general UPF network elements serving the network A; an SMF network element b1 and an SMF network element b2 in the network B are general SMF network elements serving the network B, and a UPF network element b1, a UPF network element b2, and a UPF network element b3 in the network B are general UPF network elements serving the network B. The general SMF network elements and general UPF network elements are usually deployed in an equipment room located in a central city of a convergence layer, to support mobile coverage in the network. Dedicated SMF network elements and dedicated UPF network elements serving some hotspot locations in the network are below the dashed line. For example, an SMF network element a3 and an SMF network element a4 in the network A are dedicated SMF network elements serving special areas in the network A, a UPF network element a4 and a UPF network element a5 in the network A are dedicated UPF network elements managed by the SMF network element a3 and serving one of the special areas in the network A, and a UPF network element a6 and a UPF network element a7 in the network A are dedicated UPF network elements managed by the SMF network element a4 and serving another special area in the network A; an SMF network element b3 and an SMF network element b4 in the network B are dedicated SMF network elements serving special areas in the network B, a UPF network element b4 and a UPF network element b5 in the network B are dedicated UPF network elements managed by the SMF network element b3 and serving one of the special areas in the network B, and a UPF network element b6 and a UPF network element b7 in the network B are dedicated UPF network elements managed by the SMF network element b4 and serving another special area in the network B. The dedicated SMF network elements and dedicated UPF network elements are usually deployed at edge locations, to support special services and scenarios.

However, an SMF network element serving a network can manage only a UPF network element serving the network, and cannot manage a UPF network element serving another network. In addition, a UPF network element serving some special areas in the network cannot be managed by a general SMF network element serving the network. For example, the SMF network element a1 serving the network A can manage only the UPF network element a1, the UPF network element a2, or the UPF network element a3 serving the network A, and cannot manage the UPF network element b1, the UPF network element b2, or the UPF network element b3 serving the network B. The UPF network element a4 serving the special area in the network A can be managed only by the SMF network element a3 serving the special area, and cannot be managed by the SMF network element a1 or the SMF network element a2 serving the network A.

It should be noted that, in the embodiments of this application, one data network may be served by one UPF network element, or may be served by a plurality of UPF network elements. For example, a data network 1 and a data network 4 in FIG. 1A and FIG. 1B each are served by a plurality of UPF network elements, but a data network 2, a data network 3, a data network 5, and a data network 6 in FIG. 1A and FIG. 1B each are served by one UPF network element. This is not specifically limited in the embodiments of this application.

It should be noted that a "network" in the embodiments of this application is a network corresponding to an administrative region, for example, a network corresponding to Shanghai. A special area in a network in the embodiments of this application may be, for example, an area in which an enterprise is located. General description is provided herein. This is not specifically limited in the embodiments of this application.

Based on the foregoing scenario, to ensure that a terminal can access a local data network using a local UPF network element even when the terminal is out of a management area of a remote anchor SMF network element, the embodiments of this application provide the following session management method, device, and system, which are described separately in the following.

First, several key network elements in the following embodiments are described as follows.

Remote anchor user plane function network element: The remote anchor user plane function network element in the embodiments of this application is a general user plane function network element connected to a remote data network, and may also be referred to as a remote PDU session anchor (PSA). This is not specifically limited in the embodiments of this application.

Remote anchor session management network element: The remote anchor session management network element in the embodiments of this application is a general session management network element managing a remote anchor user plane function network element.

Intermediate user plane function network element: The intermediate user plane function network element in the embodiments of this application is a general user plane function network element that interfaces with a current access network element of a terminal.

Intermediate session management network element: The intermediate session management network element in the embodiments of this application is a general session management network element that manages an intermediate user plane function network element.

Local user plane function network element: The local user plane function network element in the embodiments of this application is a dedicated user plane function network element that interfaces with a specific network.

Local session management network element: The local session management network element in the embodiments of this application is a dedicated session management network element managing a local user plane function network element.

It should be noted that names of the foregoing network elements are merely examples, and the names constitute no limitation on the network elements. During implementation, there may be other names. This is not specifically limited in the embodiments of this application.

Figure 2:
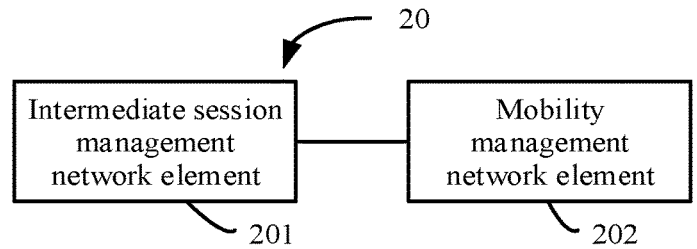
FIG. 2 is a schematic architectural diagram 1 of a session management system according to an embodiment of this application.

In a possible implementation, FIG. 2 shows a session management system 20 according to an embodiment of this application. The session management system 20 includes an intermediate session management network element 201 and a mobility management network element 202.

The intermediate session management network element 201 is configured to receive one or more local data network access identifiers (DNAI). The intermediate session management network element 201 is further configured such that, after determining a target DNAI based on current location information of a terminal and the one or more local DNAIs, the intermediate session management network element 201 sends a first message to the mobility management network element 202, where the first message carries the target DNAI.

The mobility management network element 202 is configured to receive the first message from the intermediate session management network element 201, and determine, based on the target DNAI, a local session management network element serving the terminal.

Optionally, the intermediate session management network element 201 and the mobility management network element 202 in this embodiment of this application may directly communicate with each other, or may communicate with each other through forwarding by another device. This is not specifically limited in this embodiment of this application.

Based on the session management system, the mobility management network element 202 may determine, based on the target DNAI, the local session management network element serving the terminal. Additionally, the local session management network element may manage a local user plane function network element serving the terminal. Therefore, the terminal can access a local data network using the local user plane function network element even if when the terminal is out of a management area of a remote anchor session management network element.

Optionally, the session management system 20 shown in FIG. 2 may be applied to a 5G network and another future network. This is not specifically limited in this embodiment of the present disclosure.

Figure 3:
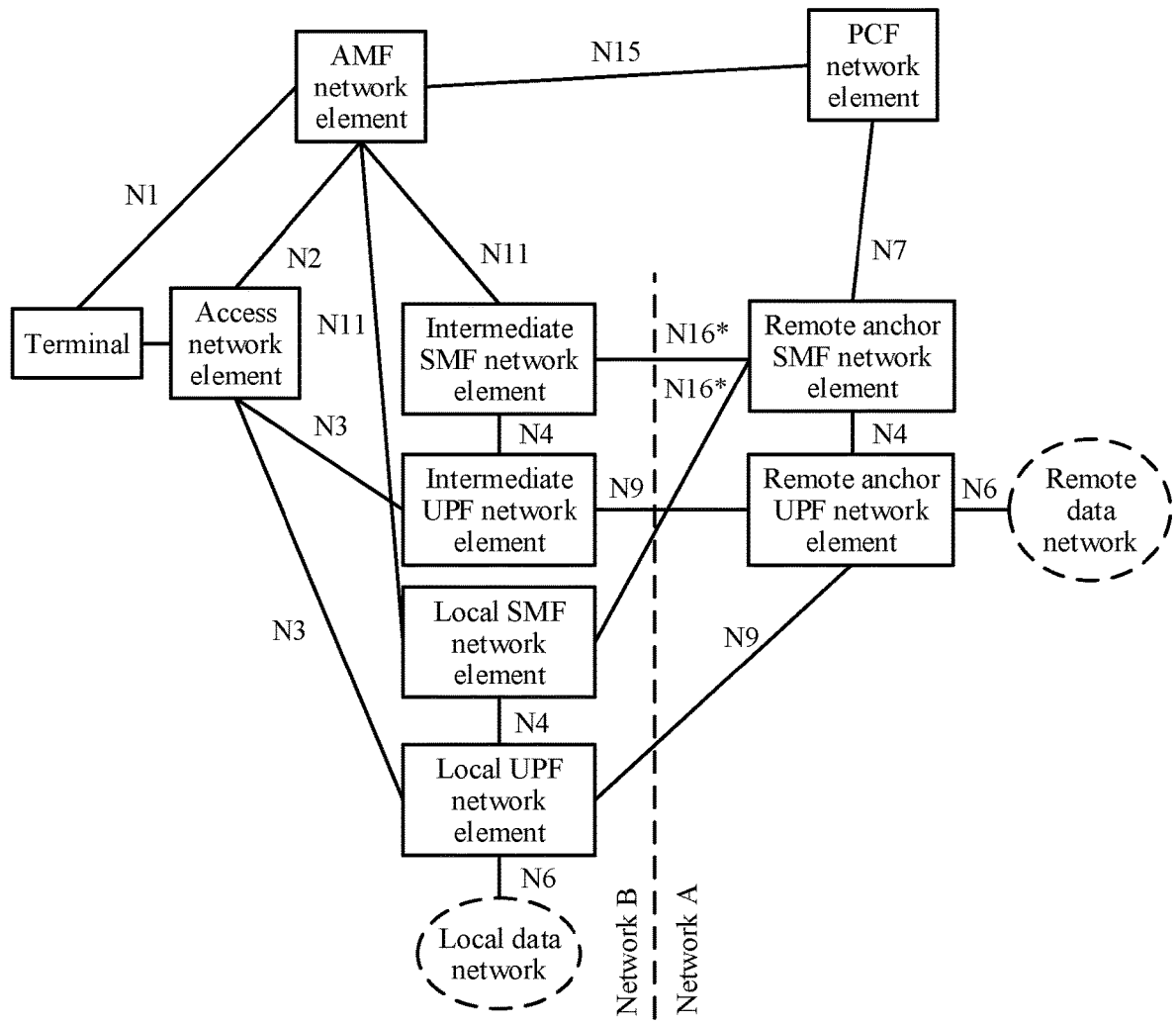
FIG. 3 is a schematic diagram of application of the session management system shown in FIG. 2 to a 5G network.

For example, assuming that the session management system 20 shown in FIG. 2 is applied to a 5G network, as shown in FIG. 3, a network element or an entity corresponding to the foregoing intermediate session management network element 201 may be an intermediate SMF network element in the 5G network, while a network element or an entity corresponding to the mobility management network element 202 may be an access and mobility management function (AMF) network element in the 5G network.

In addition, as shown in FIG. 3, the 5G network may further include an access network element, an intermediate UPF network element, a local SMF network element, a local UPF network element, a remote anchor SMF network element, a remote anchor UPF network element, a policy control function (PCF) network element, and the like. Assuming that a terminal is in a first network A before moving and the terminal is in a second network B after moving, the remote anchor SMF network element and the remote anchor UPF network element serve the first network A, and the intermediate SMF network element, the intermediate UPF network element, the local SMF network element, and the local UPF network element serve the second network B. The intermediate SMF network element is a general SMF network element serving the second network B; the intermediate UPF network element is a general UPF network element managed by the intermediate SMF network element; the local SMF network element is a dedicated SMF network element serving the second network B; and the local UPF network element is a dedicated UPF network element managed by the local SMF network element.

Although not shown, the 5G network may further include an authentication server function (AUSF) network element, a unified data management (UDM) network element, or the like. This is not specifically limited in this embodiment of this application.

The terminal accesses the network using the access network element, and the terminal communicates with the AMF network element through a next generation network (N) interface 1 (N1). The access network element communicates with the AMF network element through an N2 interface (N2), and communicates with the intermediate UPF network element and the local UPF network element through an N3 interface (N3). The AMF network element communicates with the intermediate SMF network element and the local SMF network element through an N11 interface (N11), and communicates with the PCF network element through an N15 interface (N15). The PCF network element communicates with the remote anchor SMF network element through an N7 interface (N7). The intermediate SMF network element communicates with the intermediate UPF network element through an N4 interface (N4). The remote anchor SMF network element communicates with the remote anchor UPF network element through N4. The local SMF network element communicates with the local UPF network element through N4. The remote anchor SMF network element communicates with the local SMF network element and the intermediate SMF network element through an N16* interface (N16*). The remote anchor UPF network element communicates with the intermediate UPF network element and the local UPF network element through an N9 interface (N9). The remote anchor UPF network element accesses a remote data network through an N6 interface (N6), and the local UPF network element accesses the local data network through N6.

Figure 4:
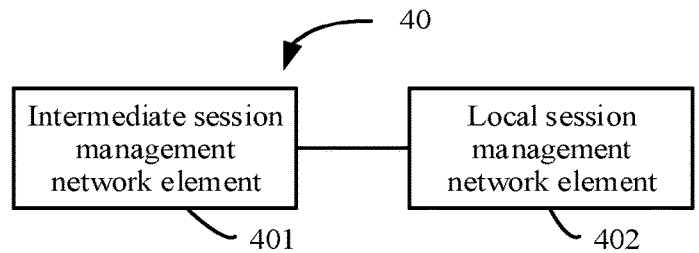
FIG. 4 is a schematic architectural diagram 2 of a session management system according to an embodiment of this application.

In another possible implementation, FIG. 4 shows a session management system 40 according to an embodiment of this application. The session management system 40 includes an intermediate session management network element 401 and a local session management network element 402.

The intermediate session management network element 401 is configured to receive one or more local DNAIs. The intermediate session management network element 401 is further configured such that, after determining a target DNAI based on current location information of a terminal and the one or more local DNAIs, the intermediate session management network element 401 determines, based on the target DNAI, a local session management network element serving the terminal.

The intermediate session management network element 401 is further configured to send a first message to the local session management network element 402, where the first message carries the current location information of the terminal.

The local session management network element 402 is configured to receive the first message from the intermediate session management network element, and select a local user plane function network element for the terminal based on the current location information of the terminal.

Optionally, the intermediate session management network element 401 and the local session management network element 402 in this embodiment of this application may directly communicate with each other, or may communicate with each other through forwarding by another device. This is not specifically limited in this embodiment of this application.

Based on the session management system, the intermediate session management network element 401 may determine, based on the target DNAI, the local session management network element 402 serving the terminal, and send, to the local session management network element 402, the first message that carries the current location information of the terminal, such that the local session management network element 402 can select the local user plane function network element for the terminal based on the current location information of the terminal. Therefore, the terminal can access a local data network using the local user plane function network element even when the terminal is out of a management area of a remote anchor session management network element.

Optionally, the session management system 40 shown in FIG. 4 may be applied to a 5G network and another future network. This is not specifically limited in this embodiment of the present disclosure.

Figure 5:
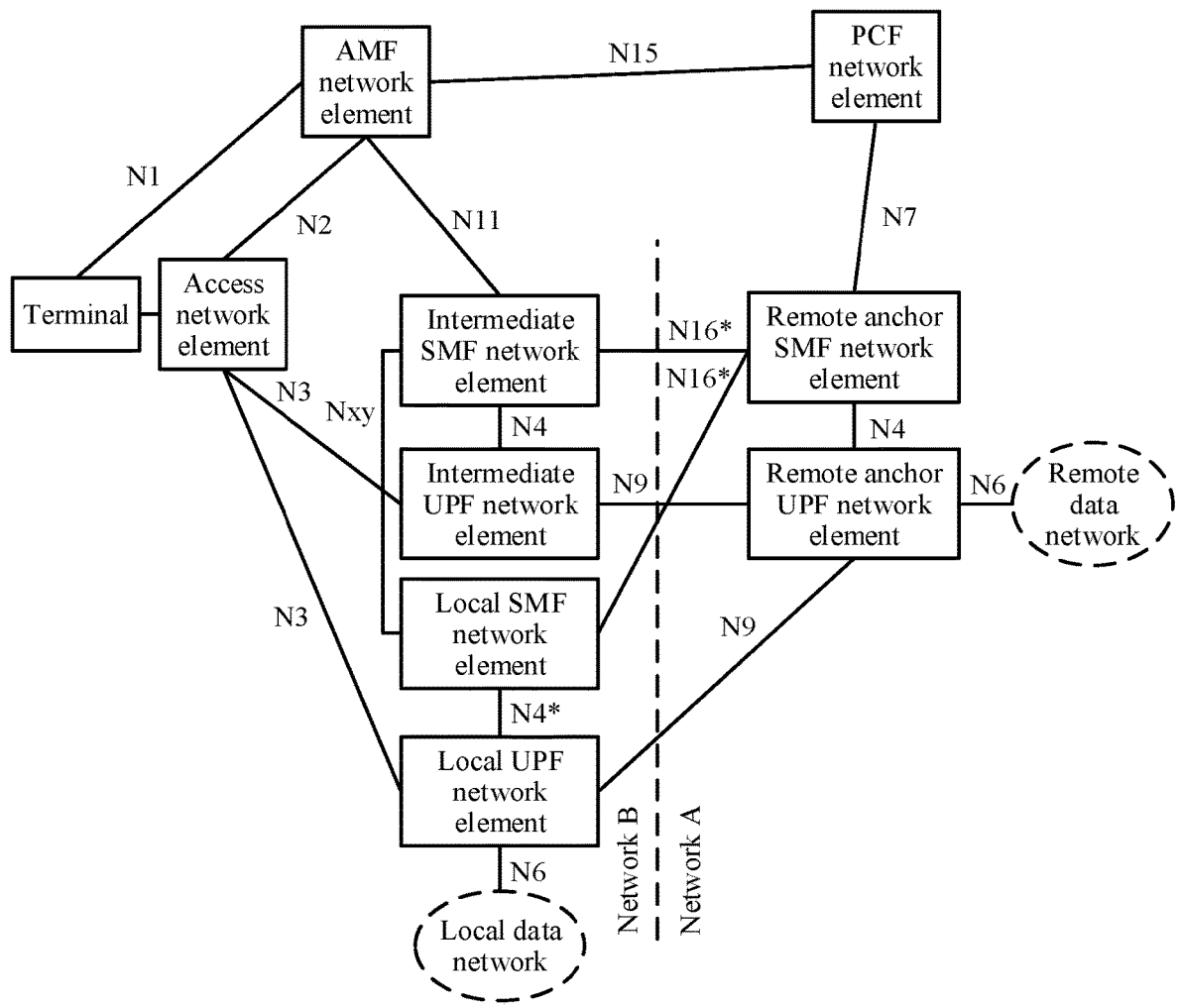
FIG. 5 is a schematic diagram of application of the session management system shown in FIG. 4 to a 5G network.

For example, assuming that the session management system 40 shown in FIG. 4 is applied to a 5G network, as shown in FIG. 5, a network element or an entity corresponding to the foregoing intermediate session management network element 401 may be an intermediate SMF network element in the 5G network, while a network element or an entity corresponding to the local session management network element 402 may be a local SMF network element in the 5G network.

In addition, as shown in FIG. 5, the 5G network may further include an access network element, an AMF network element, an intermediate UPF network element, a local UPF network element, a remote anchor SMF network element, a remote anchor UPF network element, a PCF network element, and the like. Assuming that a terminal is in a first network A before moving and the terminal is in a second network B after moving, the remote anchor SMF network element and the remote anchor UPF network element serve the first network A, and the intermediate SMF network element, the intermediate UPF network element, the local SMF network element, and the local UPF network element serve the second network B. The intermediate SMF network element is a general SMF network element serving the network B; the intermediate UPF network element is a general UPF network element managed by the intermediate SMF network element; the local SMF network element is a dedicated SMF network element serving the network B; and the local UPF network element is a dedicated UPF network element managed by the local SMF network element.

It should be noted that the local SMF network element in this embodiment of this application is a simplified SMF network element. To be more specific, the local SMF network element supports only some functions of an SMF network element, for example, supports selection and control functions of a UPF network element, and can interface with a previous level of SMF network element, for example, the intermediate SMF network element in this embodiment of this application, and perform a corresponding operation or the like according to an notification of the intermediate SMF network element, and does not directly interface with another control plane network element. In this way, a quantity of interfaces between the local SMF network element and another control plane function can be reduced, an external network topology can be shielded, and an external network element does not need to perceive a local network topology. As such, complexity of network configuration can be reduced. The local SMF network element may also be referred to as a local user plane management network element. This is not specifically limited in this embodiment of this application.

Although not shown, the 5G network may further include an AUSF network element, a UDM network element, or the like. This is not specifically limited in this embodiment of this application.

The terminal accesses the network using the access network element, and the terminal communicates with the AMF network element through N1. The access network element communicates with the AMF network element through N2, and communicates with the intermediate UPF network element and the local UPF network element through N3. The AMF network element communicates with the intermediate SMF network element, and communicates with the PCF network element through N15. The PCF network element communicates with the remote anchor SMF network element through N7. The intermediate SMF network element communicates with the intermediate UPF network element through N4, and communicates with the local SMF network element through an Nxy interface (Nxy). The local SMF network element communicates with the local UPF network element through an N4* interface (N4*). The remote anchor SMF network element communicates with the remote anchor UPF network element through N4, and communicates with the local SMF network element and the intermediate SMF network element through N16*. The remote anchor UPF network element communicates with the intermediate UPF network element and the local UPF network element through N9. The remote anchor UPF network element accesses a remote data network (DN) through N6, and the local UPF network element accesses a local DN through N6.

Figure 10:
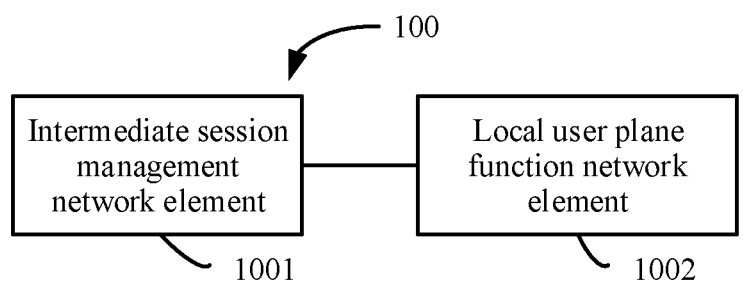
FIG. 10 is a schematic architectural diagram 3 of a session management system according to an embodiment of this application.

In another possible implementation, FIG. 10 shows a session management system 100 according to an embodiment of this application. The session management system 100 includes an intermediate session management network element 1001 and a local user plane function network element 1002.

The intermediate session management network element 1001 is configured to receive one or more local DNAIs. The intermediate session management network element 1001 is further configured such that, after determining a target DNAI based on current location information of a terminal and the one or more local DNAIs, the intermediate session management network element 1001 selects the local user plane function network element 1002 for the terminal based on the target DNAI.

Then, the intermediate session management network element 1001 may access a local data network using the local user plane function network element 1002.

It should be noted that, in this embodiment of this application, the local user plane function network element 1002 selected for the terminal is a local user plane function network element that is to serve the terminal. General description is provided herein, and details are not described below again.

Optionally, the intermediate session management network element 1001 and the local user plane function network element 1002 in this embodiment of this application may directly communicate with each other, or may communicate with each other through forwarding by another device. This is not specifically limited in this embodiment of this application.

Based on the session management system, the intermediate session management network element 1001 may determine, based on the target DNAI, the local user plane function network element 1002 serving the terminal, such that the terminal can access the local data network using the local user plane function network element 1002 even when the terminal is out of a management area of a remote anchor session management network element.

Optionally, the session management system 100 shown in FIG. 10 may be applied to a 5G network and another future network. This is not specifically limited in this embodiment of the present disclosure.

Figure 11:
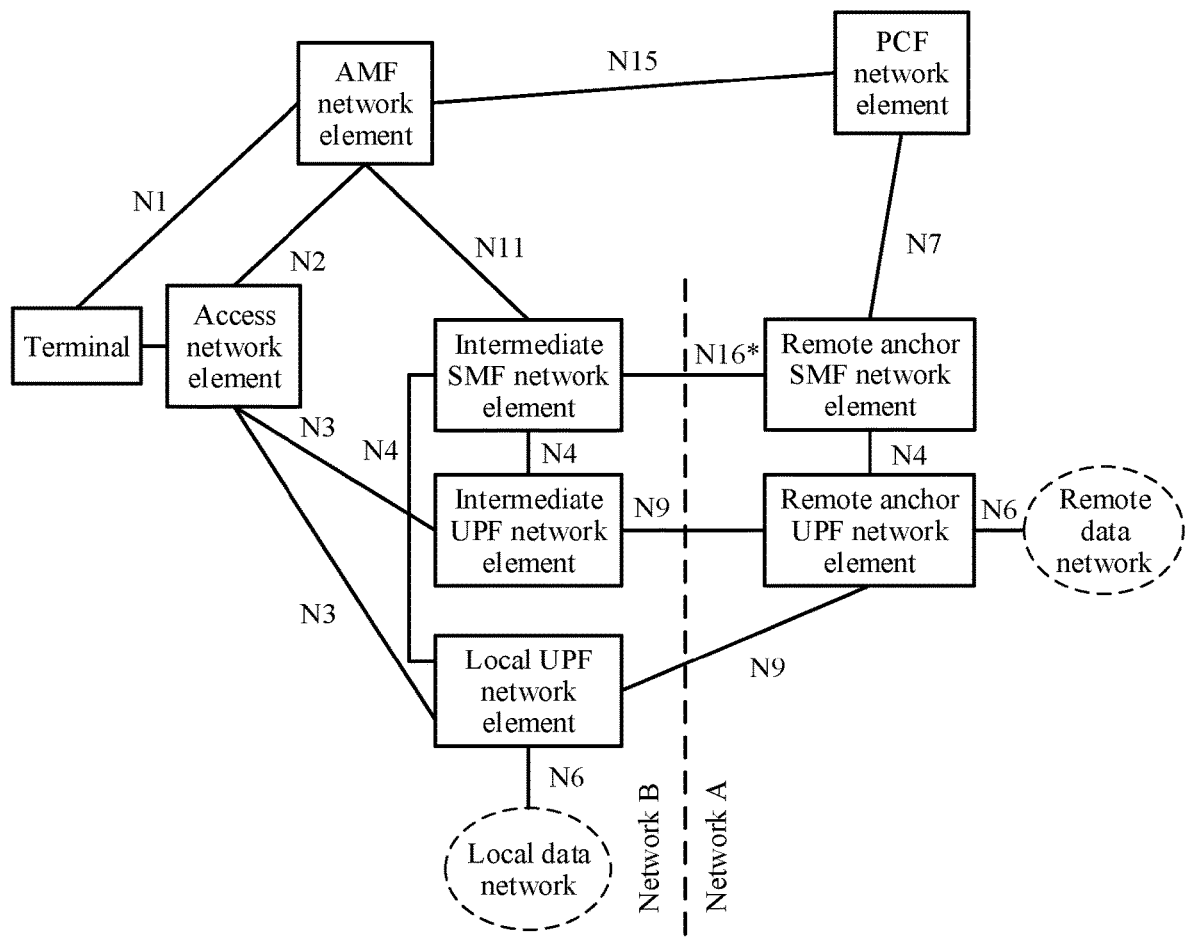
FIG. 11 is a schematic diagram of application of the session management system shown in FIG. 10 to a 5G network.

For example, assuming that the session management system 100 shown in FIG. 10 is applied to a 5G network, as shown in FIG. 11, a network element or an entity corresponding to the foregoing intermediate session management network element 1001 may be an intermediate SMF network element in the 5G network, and a network element or an entity corresponding to the local user plane function network element 1002 may be a local UPF network element in the 5G network. In addition, as shown in FIG. 11, the 5G network may further include an access network element, an AMF network element, an intermediate UPF network element, a remote anchor SMF network element, a remote anchor UPF network element, a PCF network element, and the like. The 5G network is similar to the 5G network shown in FIG. 5. One difference is that in FIG. 11, the local UPF network element connected to a local data network communicates with the intermediate SMF network element through an N4 interface (N4). In other words, the local UPF network element in FIG. 11 is directly controlled by the intermediate SMF network element, and a local SMF network element is no longer required. For other related descriptions, refer to the embodiment shown in FIG. 5. Details are not described herein again.

It should be noted that names of the interfaces between the network elements in FIG. 3, FIG. 5, or FIG. 11 are merely examples, and the interfaces may have other names during implementation. This is not specifically limited in this embodiment of this application.

It should be noted that the access network element, the AMF network element, the intermediate SMF network element, the intermediate UPF network element, the local SMF network element, the local UPF network element, the remote anchor SMF network element, the remote anchor UPF network element, the PCF network element, and the like in FIG. 3, FIG. 5, or FIG. 11 are merely names, and the names constitute no limitation on the devices. In the 5G network and another future network, network elements or entities corresponding to the access network element, the AMF network element, the intermediate SMF network element, the intermediate UPF network element, the local SMF network element, the local UPF network element, the remote anchor SMF network element, the remote anchor UPF network element, and the PCF network element may alternatively have other names. This is not specifically limited in this embodiment of this application. For example, the local UPF network element may alternatively be replaced by a local UPF or a local UPF entity or the like. General description is provided herein, and details are not described below again.

In the 5G network shown in FIG. 3, FIG. 5, or FIG. 11, after the terminal moves from the first network A to the second network B and before the local UPF network element is inserted into a session path, the intermediate SMF network element and the intermediate UPF network element are inserted into the session path. As such, the remote anchor SMF network element and the remote anchor UPF network element corresponding to the session do not change, and session continuity can be maintained. In this case, on a path used by the terminal to access the remote DN, the terminal accesses, through the access network element and the intermediate UPF network element serving the network B, the remote anchor UPF network element serving the network A. Differences between FIG. 3, FIG. 5, and FIG. 11 are as follows. In the 5G network shown in FIG. 3, after the local UPF network element is inserted into a session path, the intermediate SMF network element and the intermediate UPF network element on the original session path are replaced by the local SMF network element that manages the local UPF network element and the local UPF network element respectively, such that a control plane path between the AMF network element and the local SMF network element can be made relatively short. In the 5G network shown in FIG. 11, after the local UPF network element is inserted into a session path, the intermediate SMF network element on the original session path is retained, and the intermediate UPF network element is replaced by the local UPF network element, such that the terminal can access, using the local UPF network element, an application deployed in the local data network, thereby reducing an application access delay and saving transmission resources of the network. However, in the 5G network shown in FIG. 5, after the local UPF network element is inserted into a session path, the intermediate SMF network element on the original session path is retained, and the intermediate UPF network element is replaced by the local SMF network element and the local UPF network element. As described above, because the local SMF network element is a simplified SMF network element, an external network topology can be shielded, and an external network element does not need to perceive a local network topology, such that complexity of network configuration can be reduced.

Optionally, the terminal in this embodiment of this application may include various handheld devices, vehicle-mounted devices, wearable devices, and computing devices that have a wireless communication function, or other processing devices connected to a wireless modem. The terminal may further include a subscriber unit, a cellular phone, a smartphone or smart phone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, relay user equipment, or the like. The relay user equipment may be, for example, a 5G residential gateway (RG). For ease of description, in this application, the devices mentioned above are collectively referred to as terminals.

Optionally, the access network element in this embodiment of this application is a network element that accesses a core network. For example, the access device may be a base station, a broadband network gateway (BNG), a convergence switch, or a non-3rd generation partnership project (non-3GPP) access device. The base station may include base stations in various forms such as a macro base station, a micro base station (also referred to as a small cell), a relay station, and an access point.

Optionally, the intermediate session management network element or the mobility management network element in FIG. 2, or the intermediate session management network element or the local session management network element in FIG. 4, or the intermediate session management network element in FIG. 10 may be implemented by one device, or may be jointly implemented by a plurality of devices, or may be a function module in a device. This is not specifically limited in this embodiment of this application. It may be understood that the foregoing functions may be network elements in a hardware device, or may be software functions running on dedicated hardware, or may be virtualization functions instantiated on a platform (for example, a cloud platform).

Figure 6:
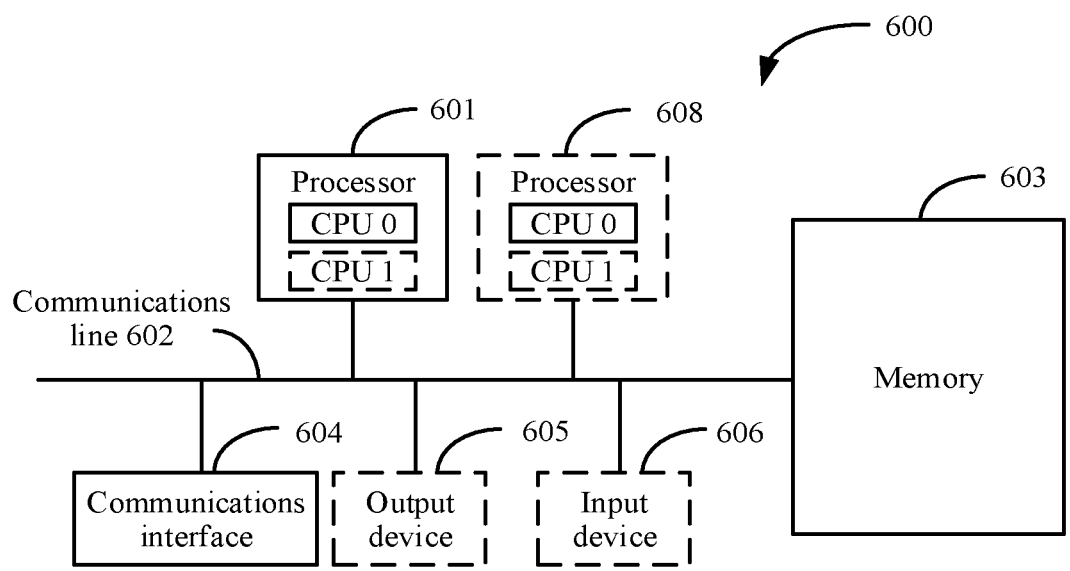
FIG. 6 is a schematic diagram of a hardware structure of a communications device according to an embodiment of this application.

For example, the intermediate session management network element or the mobility management network element in FIG. 2, or the intermediate session management network element or the local session management network element in FIG. 4, or the intermediate session management network element in FIG. 10 may be implemented by a communications device in FIG. 6. FIG. 6 is a schematic diagram of a hardware structure of a communications device according to an embodiment of this application. The communications device 600 includes at least one processor 601, a communications line 602, a memory 603, and at least one communications interface 604.

The processor 601 may be a general-purpose central processing unit (CPU), a microprocessor, an application-specific integrated circuit (ASIC), or one or more integrated circuits configured to control program execution of the solutions in this application.

The communications line 602 may include a path for transmitting information between the foregoing components.

The communications interface 604 uses any apparatus such as a transceiver, to communicate with another device or communications network such as the Ethernet, a radio access network (RAN), or a wireless local area network (WLAN).

The memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 603 is not limited thereto. The memory may exist independently and is connected to the processor through the communications line 602. The memory may be integrated with the processor.

The memory 603 is configured to store a computer executable instruction for performing the solutions in this application, and execution of the computer executable instruction is controlled by the processor 601. The processor 601 is configured to execute the computer executable instruction stored in the memory 603, to implement a session management method provided in the following embodiments of this application.

Optionally, the computer-executable instruction in this embodiment of this application may also be referred to as application program code. This is not specifically limited in this embodiment of the application.

During implementation, in an embodiment, the processor 601 may include one or more CPUs, for example, a CPU 0 and a CPU 1 in FIG. 6.

During implementation, in an embodiment, the communications device 600 may include a plurality of processors, for example, a processor 601 and a processor 608 in FIG. 6. Each of the processors may be a single-core (single-CPU) processor, or may be a multi-core (multi-CPU) processor. The processor herein may be one or more devices, circuits, and/or processing cores configured to process data (for example, a computer program instruction).

During implementation, in an embodiment, the communications device 600 may further include an output device 605 and an input device 606. The output device 605 communicates with the processor 601, and may display information in a plurality of manners. For example, the output device 605 may be a liquid crystal display (LCD), a light-emitting diode (LED) display device, a cathode ray tube (CRT) display device, or a projector. The input device 606 communicates with the processor 601, and may receive an input of a user in a plurality of manners. For example, the input device 606 may be a mouse, a keyboard, a touchscreen device, or a sensor device.

The communications device 600 may be a general-purpose device or a dedicated device. During implementation, the communications device 600 may be a desktop computer, a portable computer, a network server, a palmtop computer (PDA), a mobile phone, a tablet computer, a wireless terminal device, a built-in device, or a device having a structure similar to that in FIG. 6. A type of the communications device 600 is not limited in this embodiment of this application.

The session management method provided in embodiments of this application is described below in detail with reference to FIG. 1 to FIG. 6.

It should be noted that names of messages between network elements in the following embodiment of this application, names of parameters in the messages, or the like are merely examples, and there may be other names during implementation. This is not specifically limited in this embodiment of this application.

Figure 7A:
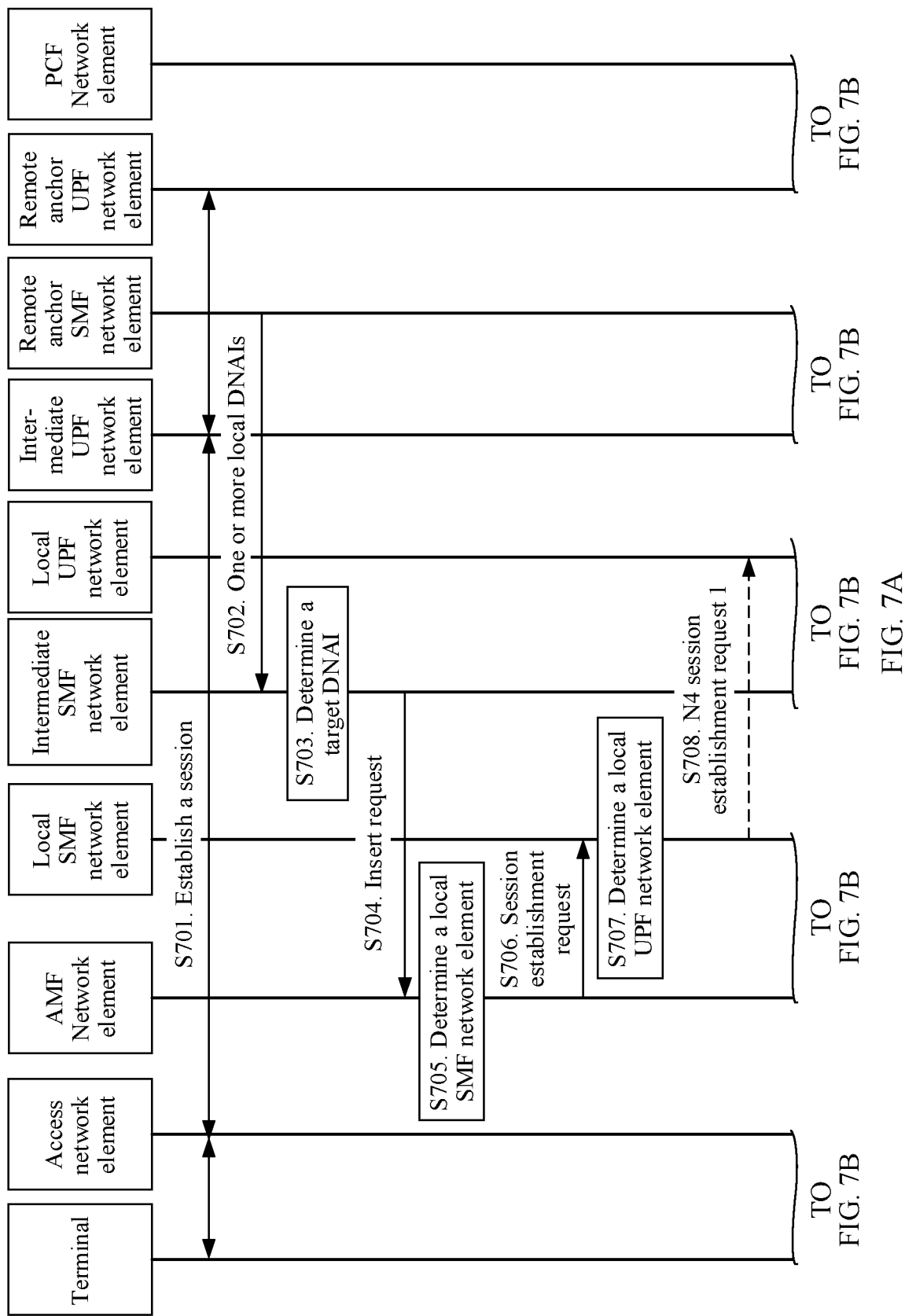
FIG. 7A and FIG. 7B are schematic flowcharts 1 of a session management method according to an embodiment of this application.
Figure 7B:
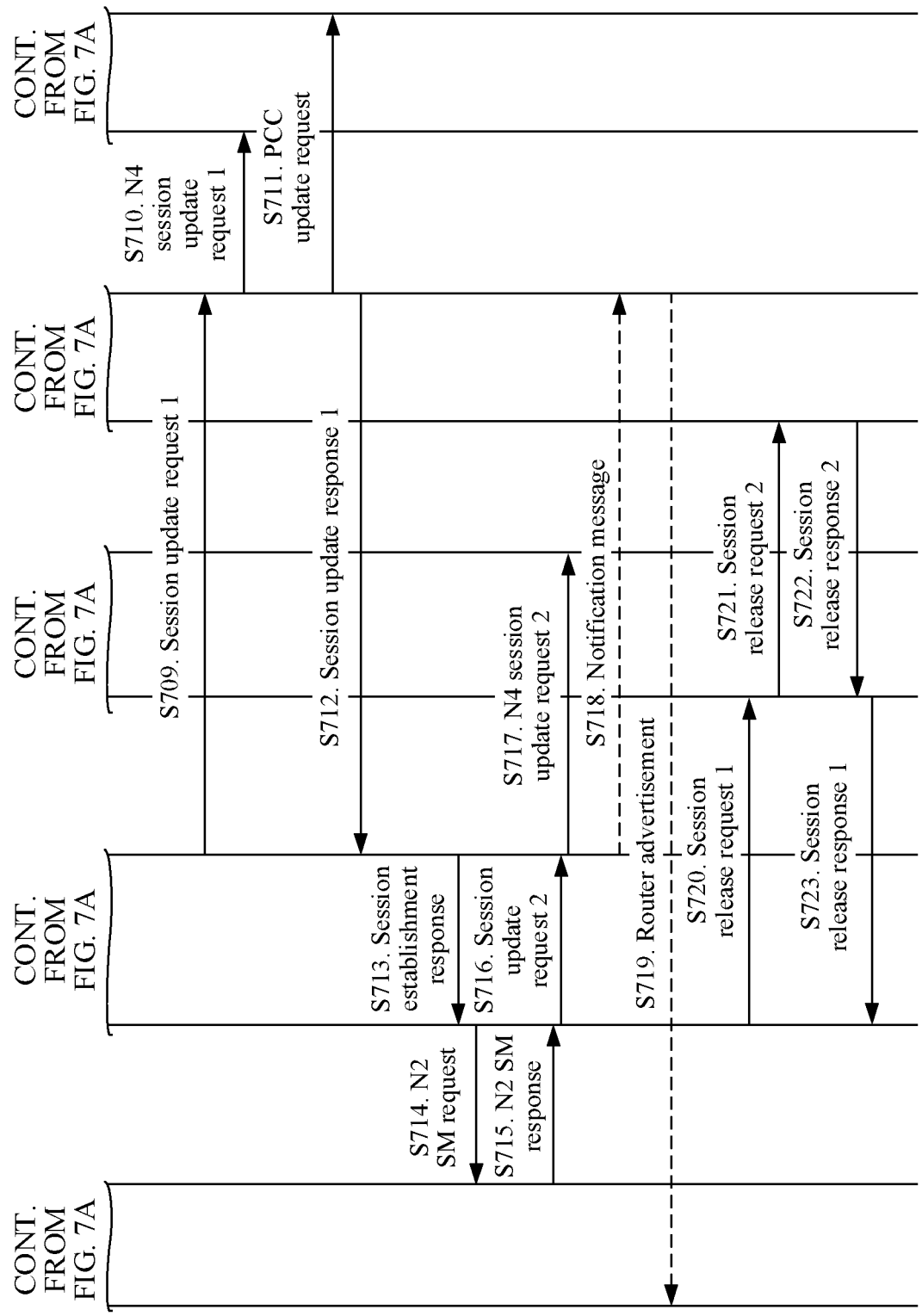

For example, the session management system shown in FIG. 2 is applied to the 5G network shown in FIG. 3. FIG. 7 shows a session management method according to an embodiment of this application, and the session management method includes the following steps.

S701. After moving from a first network A to a second network B, a terminal establishes a session, where the first network A to which a remote anchor SMF network element of the session belongs is different from the second network B to which a current access network element of the terminal belongs. Therefore, in addition to the remote anchor SMF network element serving the first network A and a remote anchor UPF network element managed by the remote anchor SMF network element, the session path further includes an intermediate SMF network element serving the second network B and an intermediate UPF network element managed by the intermediate SMF network element. In this case, a user plane path of the session is: the terminal⇔the intermediate UPF network element⇔the remote anchor UPF network element.

S702. In a session establishment process or at any time after the session is established, the remote anchor SMF network element sends one or more local DNAIs to the intermediate SMF network element, and the intermediate SMF network element receives the one or more local DNAIs from the remote anchor SMF network element.

In this embodiment of this application, the one or more local DNAIs sent by the remote anchor SMF network element to the intermediate SMF network element may be DNAIs in a PCC rule corresponding to the session.

In an implementation, the one or more local DNAIs sent by the remote anchor SMF network element to the intermediate SMF network element may be all DNAIs included in the PCC rule corresponding to the session. For example, the PCC rule corresponding to the session includes a PCC rule 1 and a PCC rule 2. If the PCC rule 1 includes a DNAI 1 and a DNAI 2, and the PCC rule 2 includes a DNAI 3 and a DNAI 4, the one or more local DNAIs include the DNAI 1, the DNAI 2, the DNAI 3, and the DNAI 4.

Alternatively, in another implementation, the one or more local DNAIs sent by the remote anchor SMF network element to the intermediate SMF network element may be a DNAI supported by the intermediate SMF network element in the PCC rule corresponding to the session. For example, the PCC rule corresponding to the session includes a PCC rule 1 and a PCC rule 2. The PCC rule 1 includes a DNAI 1 and a DNAI 2, and the PCC rule 2 includes a DNAI 3 and a DNAI 4. If DNAIs supported by the intermediate SMF network element include the DNAI 4 and a DNAI 5, the one or more local DNAIs include the DNAI 4.

Alternatively, in another implementation, the one or more local DNAIs sent by the remote anchor SMF network element to the intermediate SMF network element may be DNAIs included in a first PCC rule corresponding to the session, where the first PCC rule is a PCC rule including at least one of DNAIs supported by the intermediate SMF network element. For example, the PCC rule corresponding to the session includes a PCC rule 1 and a PCC rule 2. The PCC rule 1 includes a DNAI 1 and a DNAI 2, and the PCC rule 2 includes a DNAI 3 and a DNAI 4. If the DNAIs supported by the intermediate SMF network element include the DNAI 4 and a DNAI 5, the one or more local DNAIs include the DNAI 3 and the DNAI 4 included in the PCC rule 2.

In this embodiment of this application, the one or more local DNAIs sent by the remote anchor SMF network element to the intermediate SMF network element may alternatively be DNAIs in a PCC rule corresponding to one or more service data flows detected by an anchor UPF network element. The remote anchor SMF network element may send a reporting rule (Report Rule) to the anchor UPF network element, and when detecting a corresponding service data flow, the anchor UPF network element sends a report to the remote anchor SMF network element, such that the remote anchor SMF network element learns of the one or more service data flows detected by the anchor UPF network element.

In an implementation, the one or more local DNAIs sent by the remote anchor SMF network element to the intermediate SMF network element may be all DNAIs included in the PCC rule corresponding to the one or more service data flows detected by the anchor UPF network element. For example, the PCC rule corresponding to the one or more service data flows detected by the anchor UPF network element includes a PCC rule 1 and a PCC rule 2. If the PCC rule 1 includes a DNAI 1 and a DNAI 2, and the PCC rule 2 includes a DNAI 3 and a DNAI 4, the one or more local DNAIs include the DNAI 1, the DNAI 2, the DNAI 3, and the DNAI 4. Correspondingly, the reporting rule sent by the remote anchor SMF network element to the anchor UPF network element may be used to detect a service data flow corresponding to a PCC rule including one or more DNAIs in all PCC rules corresponding to the session. When detecting the corresponding service data flow, the anchor UPF network element sends a report to the anchor SMF network element.

Alternatively, in another implementation, the one or more local DNAIs sent by the remote anchor SMF network element to the intermediate SMF network element may be a DNAI supported by the intermediate SMF network element in the PCC rule corresponding to the one or more service data flows detected by the anchor UPF network element. For example, the PCC rule corresponding to the one or more service data flows detected by the anchor UPF network element includes a PCC rule 1 and a PCC rule 2. The PCC rule 1 includes a DNAI 1 and a DNAI 2, and the PCC rule 2 includes a DNAI 3 and a DNAI 4. If DNAIs supported by the intermediate SMF network element include the DNAI 4 and a DNAI 5, the one or more local DNAIs include the DNAI 4. Correspondingly, the reporting rule sent by the remote anchor SMF network element to the anchor UPF network element may be used to detect a service data flow corresponding to a PCC rule including at least one of the DNAIs supported by the intermediate SMF network element in all PCC rules corresponding to the session. When detecting the corresponding service data flow, the anchor UPF network element sends a report to the anchor SMF network element.

Alternatively, in another implementation, the one or more local DNAIs sent by the remote anchor SMF network element to the intermediate SMF network element may be DNAIs included in a first PCC rule corresponding to the one or more service data flows detected by the anchor UPF network element, where the first PCC rule is a PCC rule including at least one of DNAIs supported by the intermediate SMF network element. For example, the PCC rule corresponding to the one or more service data flows detected by the anchor UPF network element includes a PCC rule 1 and a PCC rule 2. The PCC rule 1 includes a DNAI 1 and a DNAI 2, and the PCC rule 2 includes a DNAI 3 and a DNAI 4. If the DNAIs supported by the intermediate SMF network element include the DNAI 4 and a DNAI 5, the one or more local DNAIs include the DNAI 3 and the DNAI 4 included in the PCC rule 2. Correspondingly, the reporting rule sent by the remote anchor SMF network element to the anchor UPF network element may be used to detect a service data flow corresponding to a PCC rule including at least one of the DNAIs supported by the intermediate SMF network element in all PCC rules corresponding to the session. When detecting the corresponding service data flow, the anchor UPF network element sends a report to the anchor SMF network element.

The foregoing optional implementations correspond to a scenario in which the anchor UPF network element detects one or more service data flows. In this case, optionally, the intermediate SMF network element may subscribe to a service data flow discovery report from the remote anchor SMF network element, such that after learning of the one or more service data flows detected by the anchor UPF network element, the remote anchor SMF network element sends the one or more local DNAIs to the intermediate SMF network element.

Optionally, when subscribing to the discovery report, the intermediate SMF network element may provide a group of local DNAIs (including one or more DNAIs), such that when the remote SMF network element learns of the one or more service data flows detected by the anchor UPF network element, and the PCC rule corresponding to the service data flow includes at least one DNAI in the group of local DNAIs, the remote SMF network element sends the one or more local DNAIs to the intermediate SMF network element.

In this case, the one or more local DNAIs sent by the remote anchor SMF network element to the intermediate SMF network element may be an intersection between the group of local DNAIs and the DNAIs in the PCC rule corresponding to the one or more service data flows detected by the anchor UPF network element. For example, the PCC rule corresponding to the one or more service data flows detected by the anchor UPF network element includes a PCC rule 1 and a PCC rule 2. The PCC rule 1 includes a DNAI 1 and a DNAI 2, and the PCC rule 2 includes a DNAI 3 and a DNAI 4. If the group of local DNAIs include the DNAI 4 and a DNAI 5, the one or more local DNAIs sent by the remote anchor SMF network element to the intermediate SMF network element include the DNAI 4. Correspondingly, the reporting rule sent by the remote anchor SMF network element to the anchor UPF network element may be used to detect a service data flow corresponding to a PCC rule including at least one group of local DNAIs in all PCC rules corresponding to the session. When detecting the corresponding service data flow, the anchor UPF network element sends a report to the anchor SMF network element.

Alternatively, the one or more local DNAIs sent by the remote anchor SMF network element to the intermediate SMF network element may be DNAIs included in a first PCC rule corresponding to the one or more service data flows detected by the anchor UPF network element, where the first PCC rule is a PCC rule including at least one of the group of local DNAIs. For example, the PCC rule corresponding to the one or more service data flows detected by the anchor UPF network element includes a PCC rule 1 and a PCC rule 2. The PCC rule 1 includes a DNAI 1 and a DNAI 2, and the PCC rule 2 includes a DNAI 3 and a DNAI 4. If the group of local DNAIs include the DNAI 4 and a DNAI 5, the one or more local DNAIs include the DNAI 3 and the DNAI 4 included in the PCC rule 2. Correspondingly, the reporting rule sent by the remote anchor SMF network element to the anchor UPF network element may be used to detect a service data flow corresponding to a PCC rule including at least one group of local DNAIs in all PCC rules corresponding to the session. When detecting the corresponding service data flow, the anchor UPF network element sends a report to the anchor SMF network element.

Optionally, the group of local DNAIs in this embodiment of this application may be the DNAIs supported by the intermediate SMF network element. This is not specifically limited in this embodiment of this application. In this case, correspondingly, information used to identify one or more DNAIs in the DNAIs supported by the intermediate SMF network element may be, for example, an identifier of the intermediate SMF network element. Additionally, the remote anchor SMF network element determines, based on the identifier of the intermediate SMF network element, the one or more DNAIs supported by the intermediate SMF network element. For another example, information used to identify one or more DNAIs in the DNAIs supported by the intermediate SMF network element may be an area identifier of the intermediate SMF network element or a set identifier of the intermediate SMF network element. In these manners, for example, the remote anchor SMF network element configures a correspondence between these identifiers and the one or more DNAIs supported by the intermediate SMF network element. This is not specifically limited in this embodiment of this application.

It should be noted that the foregoing provides merely several example manners of determining the one or more local DNAIs sent by the remote anchor SMF network element to the intermediate SMF network element. Certainly, the one or more local DNAIs sent by the remote anchor SMF network element to the intermediate SMF network element may alternatively be determined in another manner. This is not specifically limited in this embodiment of this application.

Optionally, in this embodiment of this application, if the intermediate SMF network element provides only one DNAI during subscription, when the remote SMF network element discovers a service data flow, and a PCC rule corresponding to the service data flow includes the DNAI, the remote SMF network element sends a notification message to the intermediate SMF network element. The notification message may not carry the DNAI, and the notification message is used to indicate that a service data flow supporting the DNAI is discovered.

Optionally, in this embodiment of this application, the one or more local DNAIs may be sent by a PCF network element to the remote anchor SMF network element and then directly forwarded to the intermediate SMF network element by the remote anchor SMF network element. Alternatively, the remote anchor SMF network element may receive a plurality of local DNAIs from a PCF network element, then select the one or more local DNAIs from the plurality of local DNAIs and send the one or more local DNAIs to the intermediate SMF network element. This is not specifically limited in this embodiment of this application.

Optionally, in this embodiment of this application, the remote anchor SMF network element may further send application identification information corresponding to the one or more local DNAIs to the intermediate SMF network element. The application identification information may include an application identifier, a 5-tuple, other information that can identify an application, or the like. This is not specifically limited in this embodiment of this application. Alternatively, in this embodiment of this application, the remote anchor SMF network element may send the application identification information to a local SMF network element after learning of information about the local SMF network element. This is not specifically limited in this embodiment of this application. The application identification information in this embodiment of this application is usually sent by the PCF network element to the remote anchor SMF network element. General description is provided herein, and details are not described below again.

Optionally, in this embodiment of this application, the remote anchor SMF network element may further send information about a session access mode to the intermediate SMF network element. The session access mode may be, for example, an uplink classifier (ULCL) mode or a multi-homing mode. This is not specifically limited in this embodiment of this application. Alternatively, the remote anchor SMF network element may send the information about the session access mode to the local SMF network element after learning of the information about the local SMF network element. This is not specifically limited in this embodiment of this application. The information about the session access mode in this embodiment of this application may be sent by the PCF network element to the remote anchor SMF network element, or may be determined by the remote anchor SMF network element. This is not specifically limited in this embodiment of this application.

Optionally, in this embodiment of this application, if the session access mode is the multi-homing mode, the remote anchor SMF network element may further send, to the intermediate SMF network element, a remote internet protocol (IP) address allocated by the remote anchor SMF network element to the terminal. This is not specifically limited in this embodiment of this application.

Optionally, in this embodiment of this application, if there is an interface between the intermediate SMF network element and the PCF network element, the PCF network element may directly send the foregoing information, such as the one or more local DNAIs, the application identification information, the information about the session access mode, or the remote IP address, to the intermediate SMF network element. This is not specifically limited in this embodiment of this application.

S703. The intermediate SMF network element determines a target DNAI based on current location information of the terminal and the one or more local DNAIs.

For example, if it is determined, based on the current location information of the terminal, that there is a local data network nearby a current location of the terminal, a local DNAI corresponding to the local data network may be determined as the target DNAI. Alternatively, if it is determined, based on the current location information of the terminal, that there are a plurality of local data networks nearby a current location of the terminal, a local DNAI corresponding to a local data network with relatively low load in the plurality of local data networks may be determined as the target DNAI. This is not specifically limited in this embodiment of this application.

Optionally, if it is determined, based on the current location information of the terminal and the one or more local DNAIs, that there is no target DNAI, the intermediate SMF network element may determine the target DNAI based on the current location information of the terminal and the one or more local DNAIs after a location of the terminal changes again. This is not specifically limited in this embodiment of this application.

Optionally, if one application corresponds to one or more local DNAIs, the intermediate SMF network element may select a target DNAI from the one or more local DNAIs based on location information of the terminal.

Optionally, if there are a plurality of applications in step S702, the intermediate SMF network element may select a target DNAI for each application.

S704. The intermediate SMF network element sends an insertion request to an AMF network element, and the AMF network element receives the insertion request from the intermediate SMF network element. The insertion request carries the target DNAI, and is used to request to insert a local UPF network element.

Optionally, if the intermediate SMF network element can obtain the application identification information corresponding to the one or more local DNAIs, after the intermediate SMF network element determines the target DNAI, the insertion request may further carry application identification information corresponding to the target DNAI.

Optionally, if the intermediate SMF network element can obtain the information about the session access mode, the insertion request may further carry the information about the session access mode.

Optionally, in this embodiment of this application, if the session access mode is the ULCL mode, the local UPF network element may be a ULCL. Alternatively, if the session access mode is the multi-homing mode, the local UPF network element may be a branching point (BP). General description is provided herein, and details are not described below again.

Optionally, in this embodiment of this application, if the session access mode is the multi-homing mode, the insertion request may further carry the remote IP address allocated by the remote anchor SMF network element to the terminal. This is not specifically limited in this embodiment of this application.

S705. The AMF network element determines, based on the target DNAI, the local SMF network element serving the terminal.

Optionally, in this embodiment of this application, the AMF network element may determine, based on the target DNAI, the local SMF network element serving the terminal by selecting the local SMF network element for the terminal based on the target DNAI and local configuration information.

Alternatively, in this embodiment of this application, that the AMF network element determines, based on the target DNAI, the local SMF network element serving the terminal may include: requesting, by the AMF network element, the information about the local SMF network element from a network function repository network element, for example, a network function repository function (NRF) network element; and after selecting the local SMF network element for the terminal based on the target DNAI, sending, by the NRF network element, the information about the local SMF network element to the AMF network element. A manner of determining, by the AMF network element based on the target DNAI, the local SMF network element serving the terminal is not specifically limited in this embodiment of this application.

Optionally, in this embodiment of this application, if the insertion request further carries the information about the session access mode, in addition to the target DNAI, the AMF network element may further consider the information about the session access mode when determining the local SMF network element serving the terminal. For example, the AMF network element or the NRF network element selects a local SMF network element that supports the session access mode. This is not specifically limited in this embodiment of this application.

S706. The AMF network element sends a session establishment request to the local SMF network element, and the local SMF network element receives the session establishment request from the AMF network element. The session establishment request carries the current location information of the terminal.

Optionally, in this embodiment of this application, if the AMF network element can further obtain the information about the session access mode, the session establishment request may further carry the information about the session access mode. This is not specifically limited in this embodiment of this application.

Optionally, in this embodiment of this application, if the AMF network element can further obtain the application identification information corresponding to the target DNAI, the session establishment request may further carry the application identification information corresponding to the target DNAI. This is not specifically limited in this embodiment of this application.

Optionally, in this embodiment of this application, if the local SMF network element supports a plurality of local data networks, the session establishment request may further carry the target DNAI. The target DNAI is used to indicate a local data network currently accessed by the terminal. This is not specifically limited in this embodiment of this application.

Optionally, in this embodiment of this application, if the AMF network element can further obtain the remote IP address, the session establishment request may further carry the remote IP address. This is not specifically limited in this embodiment of this application.

Optionally, in this embodiment of this application, the session establishment request may further carry information about the remote anchor SMF network element, for communication between the local SMF network element and the remote SMF. This is not specifically limited in this embodiment of this application.

S707. The local SMF network element determines, based on the current location information of the terminal, the local UPF network element serving the terminal.

Optionally, in this embodiment of this application, the local SMF network element may determine, based on the current location information of the terminal, the local UPF network element serving the terminal by selecting the local UPF network element for the terminal based on the current location information of the terminal.

Alternatively, in this embodiment of this application, that the local SMF network element determines, based on the current location information of the terminal, the local UPF network element serving the terminal may include: requesting, by the local SMF network element, information about the local UPF network element from the network function repository network element, for example, the NRF network element; and after selecting the local UPF network element for the terminal based on the current location information of the terminal, sending, by the NRF network element, the information about the local UPF network element to the local SMF network element. A manner of determining, by the local SMF network element based on the current location information of the terminal, the local UPF network element serving the terminal is not specifically limited in this embodiment of this application.

Optionally, in this embodiment of this application, if the session establishment request carries the information about the session access mode, in addition to the location information of the terminal, the local SMF network element may further consider the information about the session access mode when determining the local UPF network element serving the terminal. For example, the local SMF network element or the NRF network element selects a local UPF network element that supports the session access mode. This is not specifically limited in this embodiment of this application.

Optionally, in this embodiment of this application, if the session establishment request carries the target DNAI, the local SMF may further consider the target DNAI when determining the local UPF network element serving the terminal. For example, the local SMF network element or the NRF network element selects a local UPF network element connected to a local data network corresponding to the target DNAI. This is not specifically limited in this embodiment of this application.

S708. The local SMF network element sends an N4 session establishment request 1 to the local UPF network element, and the local UPF network element receives the N4 session establishment request 1 from the local SMF network element. The N4 session establishment request 1 is used to establish a corresponding session on the local UPF network element.

Optionally, if the local SMF network element can obtain the information about the session access mode, and the session access mode corresponding to the information about the session access mode is the multi-homing mode, the local SMF network element may further allocate a local IP address to the terminal, and notify, using the N4 session establishment request 1, the local UPF network element to offload a data packet whose source address is the local IP address to a local data network corresponding to the target DNAI. This is not specifically limited in this embodiment of this application. A manner of notifying the local UPF network element to offload the data whose source address is the local IP address to the local data network corresponding to the target DNAI may be: after generating a first local routing rule, sending, by the local SMF network element, the first local routing rule to the local UPF network element using the N4 session establishment request 1, where the first local routing rule is used to offload the data packet whose source address is the local IP address to the local data network corresponding to the target DNAI. This is not specifically limited in this embodiment of this application.

Optionally, if the local SMF network element can obtain the information about the session access mode, the session access mode corresponding to the information about the session access mode is the multi-homing mode, and the local SMF network element can obtain the remote IP address, the local SMF network element may further notify, using the N4 session establishment request 1, the local UPF network element to offload data whose source address is the remote IP address to the remote anchor UPF network element. A manner of notifying the local UPF network element to offload the data whose source address is the remote IP address to the remote anchor UPF network element may be: after generating a remote routing rule, sending, by the local SMF network element, the remote routing rule to the local UPF network element using the N4 session update request 1, where the remote routing rule is used to offload a data packet whose source address is the remote IP address to the remote anchor UPF network element.

Certainly, if the first local routing rule and the remote routing rule may be generated at the same time, the first local routing rule and the remote routing rule may alternatively be sent to the local UPF network element using different messages. This is not specifically limited in this embodiment of this application.

Optionally, if the local SMF network element can obtain the information about the session access mode, and the session access mode corresponding to the information about the session access mode is the ULCL mode, the local SMF network element may generate a second local routing rule based on at least one of the local configuration information or the application identification information corresponding to the target DNAI, and then send the second local routing rule to the local UPF network element using the N4 session establishment request 1, where the second local routing rule is used to offload data to the local data network corresponding to the target DNAI. This is not specifically limited in this embodiment of this application. The application identification information corresponding to the target DNAI and required for generation of the second local routing rule may be carried in the session establishment request in step S706, or may be sent to the local SMF network element (for example, sent to the local SMF network element in subsequent step S712) by the remote anchor SMF network element after the local SMF network element communicates with the remote anchor SMF network element based on the information about the remote anchor SMF network element that is carried in the session establishment request in step S706. This is not specifically limited in this embodiment of this application.

Optionally, in this embodiment of this application, the local UPF network element may further send an N4 session establishment response 1 corresponding to the N4 session establishment request 1 to the local SMF network element. This is not specifically limited in this embodiment of this application.

S709. The local SMF network element sends a session update request 1 to the remote anchor SMF network element, and the remote anchor SMF network element receives the session update request 1 from the local SMF network element. The session update request is used to update a downlink tunnel of the remote anchor UPF network element to be connected to the local UPF network element.

Optionally, the session update request 1 may carry downlink tunnel information of the local UPF network element. The downlink tunnel information of the local UPF network element may include, for example, a tunnel identifier, on a side of the local UPF network element, of an N9 tunnel between the remote anchor UPF network element and the local UPF network element. The tunnel identifier may include, for example, an endpoint address or an endpoint identifier. The endpoint identifier may be, for example, a tunnel endpoint identifier (TEID). This is not specifically limited in this embodiment of this application. The downlink tunnel information of the local UPF network element may be allocated by the local SMF network element. Alternatively, the downlink tunnel information may be allocated by the local UPF network element and then sent to the local SMF network element. This is not specifically limited in this embodiment of this application.

Optionally, if the local SMF network element can obtain the information about the session access mode, and the session access mode corresponding to the information about the session access mode is the multi-homing mode, the session update request 1 may further carry the local IP address allocated by the local SMF network element to the terminal.

Optionally, in this embodiment of this application, if the local SMF network element can obtain the target DNAI, the session update request 1 may further carry the target DNAI, where the target DNAI is used to perform charging and policy control. For example, the remote anchor SMF network element may determine, based on the target DNAI, which charging and policy control rules should be performed by the local UPF network element. This is not specifically limited in this embodiment of this application.

Optionally, in this embodiment of this application, if the downlink tunnel information of the local UPF network element is allocated by the local SMF network element, there is no necessary execution sequence between step S708 and step S709. Step S708 may be performed before or after step S709, or step S708 and step S709 may be performed simultaneously. This is not specifically limited in this embodiment of this application.

S710. The remote anchor SMF network element sends an N4 session update request 1 to the remote anchor UPF network element, and the remote anchor UPF network element receives the N4 session update request 1 from the remote anchor SMF network element.

The N4 session update request 1 carries the downlink tunnel information of the local UPF network element, and is used to establish an N9 tunnel between the local UPF network element and the remote anchor UPF network element.

Optionally, in this embodiment of this application, the remote anchor UPF network element may further send an N4 session update response 1 corresponding to the N4 session update request 1 to the remote anchor SMF network element. This is not specifically limited in this embodiment of this application.

S711. The remote anchor SMF network element sends a policy and charging control (PCC) update request to the PCF network element, and the PCF network element receives the PCC update request from the remote anchor SMF network element. The PCC update request carries the target DNAI, and is used to perform charging and policy control.

Optionally, the PCC update request may carry the local IP address allocated by the local SMF network element to the terminal. This is not specifically limited in this embodiment of this application.

Optionally, in this embodiment of this application, there is no necessary execution sequence between step S710 and step S711. Step S710 may be performed before or after step S711, or step S710 and step S711 may be performed simultaneously. This is not specifically limited in this embodiment of this application.

Optionally, if the local SMF network element does not allocate the local IP address to the terminal in the foregoing process, the local SMF network element may subsequently allocate the local IP address to the terminal, and then send the local IP address to the remote anchor SMF network element (for example, send the local IP address to the remote anchor SMF network element in subsequent step S718). Additionally, the remote anchor SMF network element sends the local IP address to the PCF network element. This is not specifically limited in this embodiment of this application.

Optionally, in this embodiment of this application, the PCF network element may further send a PCC update response corresponding to the PCC update request to the remote anchor SMF network element. This is not specifically limited in this embodiment of this application.

S712. The remote anchor SMF network element sends a session update response 1 to the local SMF network element, and the local SMF network element receives the session update response 1 from the remote anchor SMF network element.

The session update response 1 carries uplink tunnel information of the remote anchor UPF network element. The uplink tunnel information of the remote anchor UPF network element may include, for example, a tunnel identifier, on a side of the remote anchor UPF network element, of the N9 tunnel between the remote anchor UPF network element and the local UPF network element. The tunnel identifier may include, for example, an endpoint address or an endpoint identifier. The endpoint identifier may be, for example, a TEID. This is not specifically limited in this embodiment of this application. The uplink tunnel information of the remote anchor UPF network element may be allocated by the remote anchor SMF network element, or may be allocated by the remote anchor UPF network element and then sent to the remote anchor SMF network element. This is not specifically limited in this embodiment of this application.

Optionally, in this embodiment of this application, if the remote anchor SMF network element does not send the information about the session access mode to the intermediate SMF network element in step S702, the session update response 1 in step S712 may carry the information about the session access mode.

Optionally, in this embodiment of this application, if the remote anchor SMF network element does not send the application identification information corresponding to the one or more local DNAIs to the intermediate SMF network element in step S702, the session update response 1 in step S712 may carry the application identification information corresponding to the one or more local DNAIs or the application identification information corresponding to the target DNAI. This is not specifically limited in this embodiment of this application.

Optionally, in this embodiment of this application, if the session access mode is the multi-homing mode, the session update response 1 may further carry the remote IP address allocated by the remote anchor SMF network element to the terminal. This is not specifically limited in this embodiment of this application.

S713. The local SMF network element sends a session establishment response to the AMF network element, and the AMF network element receives the session establishment response from the local SMF network element.

Optionally, if the session is currently in an active state, the session establishment response may further carry uplink tunnel information of the local UPF network element, where the uplink tunnel information of the local UPF network element is used to establish an N3 tunnel between the local UPF network element and the access network element. The uplink tunnel information of the local UPF network element may include, for example, a tunnel identifier, on the side of the local UPF network element, of an N3 tunnel between the local UPF network element and the access network element. The tunnel identifier may include, for example, an endpoint address or an endpoint identifier. The endpoint identifier may be, for example, a TEID. This is not specifically limited in this embodiment of this application.

S714. The AMF network element sends an N2 session management (SM) request to the access network element, and the access network element receives the N2 SM request from the AMF network element.

The N2 SM request carries the uplink tunnel information of the local UPF network element, and is used to establish the N3 tunnel between the local UPF network element and the access network element. In addition, the N2 SM request is further used to allocate a radio resource to the session.

S715. The access network element sends an N2 SM response to the AMF network element, and the AMF network element receives the N2 SM response from the access network element.

The N2 SM response carries downlink tunnel information of the access network element. The downlink tunnel information of the access network element is used to establish the N3 tunnel between the local UPF network element and the access network element. The downlink tunnel information of the access network element may include, for example, a tunnel identifier, on a side of the access network element, of the N3 tunnel between the local UPF network element and the access network element. The tunnel identifier may include, for example, an endpoint address or an endpoint identifier. The endpoint identifier may be, for example, a TEID. This is not specifically limited in this embodiment of this application.

Optionally, in this embodiment of this application, before sending the N2 SM response to the AMF network element, the access network element may further configure a radio resource for the session based on a requirement. This is not specifically limited in this embodiment of this application.

S716. The AMF network element sends a session update request 2 to the local SMF network element, and the local SMF network element receives the session update request 2 from the AMF network element.

The session update request 2 carries the downlink tunnel information of the access network element.

Optionally, in this embodiment of this application, the local SMF network element may further send a session update response 2 corresponding to the session update request 2 to the AMF network element. This is not specifically limited in this embodiment of this application.

S717. The local SMF network element sends an N4 session update request 2 to the local UPF network element, and the local UPF network element receives the N4 session update request 2 from the local SMF network element. The N4 session update request 2 is used to update a corresponding session on the local UPF network element.

The N4 session update request 2 carries the uplink tunnel information of the remote anchor UPF network element, and is used to establish the N9 tunnel between the remote anchor UPF network element and the local UPF network element. The N4 session update request 2 carries the downlink tunnel information of the access network element, and is used to establish the N3 tunnel between the access network element and the local UPF network element.

Optionally, in this embodiment of this application, if the local SMF network element can obtain the information about the session access mode after step S706, and the session access mode corresponding to the information about the session access mode is the multi-homing mode, but the local SMF network element cannot learn of information about the remote IP address, the local SMF network element may further notify the local UPF network element to offload the data whose source address is the remote IP address to the remote anchor UPF network element. For a manner of notifying, by the local SMF network element, the local UPF network element to offload the data whose source address is the remote IP address to the remote anchor UPF network element, refer to the description in step S708. Details are not described herein again.

Optionally, in this embodiment of this application, if the local SMF network element obtains the information about the session access mode in step S712, and the session access mode is the multi-homing mode, the local SMF network element allocates the local IP address to the terminal, and notifies the local UPF network element to offload the data whose source address is the local IP address to the local data network corresponding to the target DNAI, and offload the data whose source address is the remote IP address to the remote anchor UPF network element. For a manner of notifying the local UPF network element to offload the data whose source address is the local IP address to the local data network corresponding to the target DNAI, and a manner of notifying the local UPF network element to offload the data whose source address is the remote IP address to the remote anchor UPF network element, refer to the related descriptions in step S708. Details are not described herein again.

Optionally, in this embodiment of this application, if the local SMF network element obtains the information about the session access mode in step S712, and the session access mode is the ULCL mode, the local SMF network element may generate the second local routing rule based on at least one of the local configuration information or the application identification information corresponding to the target DNAI. The local SMF network element may then send the second local routing rule to the local UPF network element using the N4 session update request 2, where the second local routing rule is used to offload data to the local data network corresponding to the target DNAI. This is not specifically limited in this embodiment of this application.

Optionally, in this embodiment of this application, if the local SMF network element obtains the information about the session access mode in step S712, and the downlink tunnel information of the local UPF network element is allocated by the local SMF network element, the local SMF network element may not need to perform step S708. Alternatively, in this embodiment of this application, if the local SMF network element obtains the information about the session access mode in step S706, but the session access mode is the multi-homing mode, the local SMF network element may not need to allocate the local IP address to the terminal after step S706. Instead, the local SMF network element allocates the local IP address to the terminal, generates the first local routing rule after step S712, and then sends the second local routing rule to the local UPF network element using the N4 session establishment request 2. This is not specifically limited in this embodiment of this application.

Optionally, in this embodiment of this application, the local UPF network element may further send an N4 session update response 2 corresponding to the N4 session update request 2 to the local SMF network element. This is not specifically limited in this embodiment of this application.

S718. The local SMF network element sends a notification message to the remote anchor SMF network element, and the remote anchor SMF network element receives the notification message from the local SMF network element. The notification message carries the local IP address allocated by the local SMF network element to the terminal.

It should be noted that step S718 is an optional step, which corresponds to a case in which the local SMF network element obtains the information about the session access mode in step S712. Certainly, if the local SMF network element allocates the local IP address to the terminal based on the information about the session access mode after step S706, the local IP address may be carried in the session update request 1 in step S709. This is not specifically limited in this embodiment of this application.

S719. The remote anchor SMF network element sends a router advertisement (RA) to the terminal, and the terminal receives the router advertisement from the remote anchor SMF network element. The router advertisement carries the local IP address.

In this embodiment of this application, the remote anchor SMF network element sends the router advertisement to the terminal using a user plane. The user plane refers to the N9 tunnel between the remote anchor UPF network element and the local UPF network element. General description is provided herein, and details are not described below again.

It should be noted that step S719 is an optional step, which corresponds to a case in which the session access mode is the multi-homing mode. General description is provided herein, and details are not described below again.

Optionally, the router advertisement may alternatively be sent by the local SMF network element to the terminal after the local SMF network element allocates the local IP address to the terminal. This is not specifically limited in this embodiment of this application.

S720. The AMF network element sends a session release request 1 to the intermediate SMF network element, and the intermediate SMF network element receives the session release request 1 from the AMF network element. The session release request 1 is used to notify to release session resources of the terminal on the intermediate SMF network element and on the intermediate UPF network element.

Optionally, the session release request 1 may carry a piece of indication information. The indication information is used to notify to release only the session resources of the terminal on the intermediate SMF network element and the intermediate UPF network element, and not to release a session resource of the terminal on the remote anchor SMF network element. In this way, after receiving the session release request, the intermediate SMF network element may release a session resource of the terminal on the intermediate SMF network element, and does not release the session resource of the terminal on the remote anchor SMF network element.

S721. The intermediate SMF network element sends a session release request 2 to the intermediate UPF network element, and the intermediate UPF network element receives the session release request 2 from the intermediate SMF network element. The session release request 2 is used to notify to release a session resource of the terminal on the intermediate UPF network element.

In this way, after receiving the session release request 2, the intermediate UPF network element may release the session resource of the terminal on the intermediate UPF network element.

S722. The intermediate UPF network element sends a session release response 2 to the intermediate SMF network element after the session resource of the terminal on the intermediate UPF network element has been released. The session release response 2 is used to indicate that the session resource of the terminal on the intermediate UPF network element has been released.

S723. The intermediate SMF network element sends the session release request 1 to the AMF network element after the session resources of the terminal on the intermediate UPF network element and the intermediate SMF network element have been released. The session release response 2 is used to indicate that the session resources of the terminal on the intermediate UPF network element and the intermediate SMF network element have been released.

Until now, in addition to the remote anchor SMF network element serving the network A and the remote anchor UPF network element managed by the remote anchor SMF network element, the session path further includes the local SMF network element serving the network B and the local UPF network element managed by the local SMF network element. In this case, a user plane path of the session is: the terminal↔the local UPF network element↔the remote anchor UPF network element.

Based on the session management method provided in this embodiment of this application, the terminal can access the local data network using the local UPF network element even when the terminal is out of the management area of the remote anchor SMF network element.

The actions of the intermediate SMF network element in steps S701 to S723 may be performed by the processor 601 in the communications device 600 shown in FIG. 6 by invoking the application program code stored in the memory 603. This is not limited in this embodiment of this application.

Figure 8A:
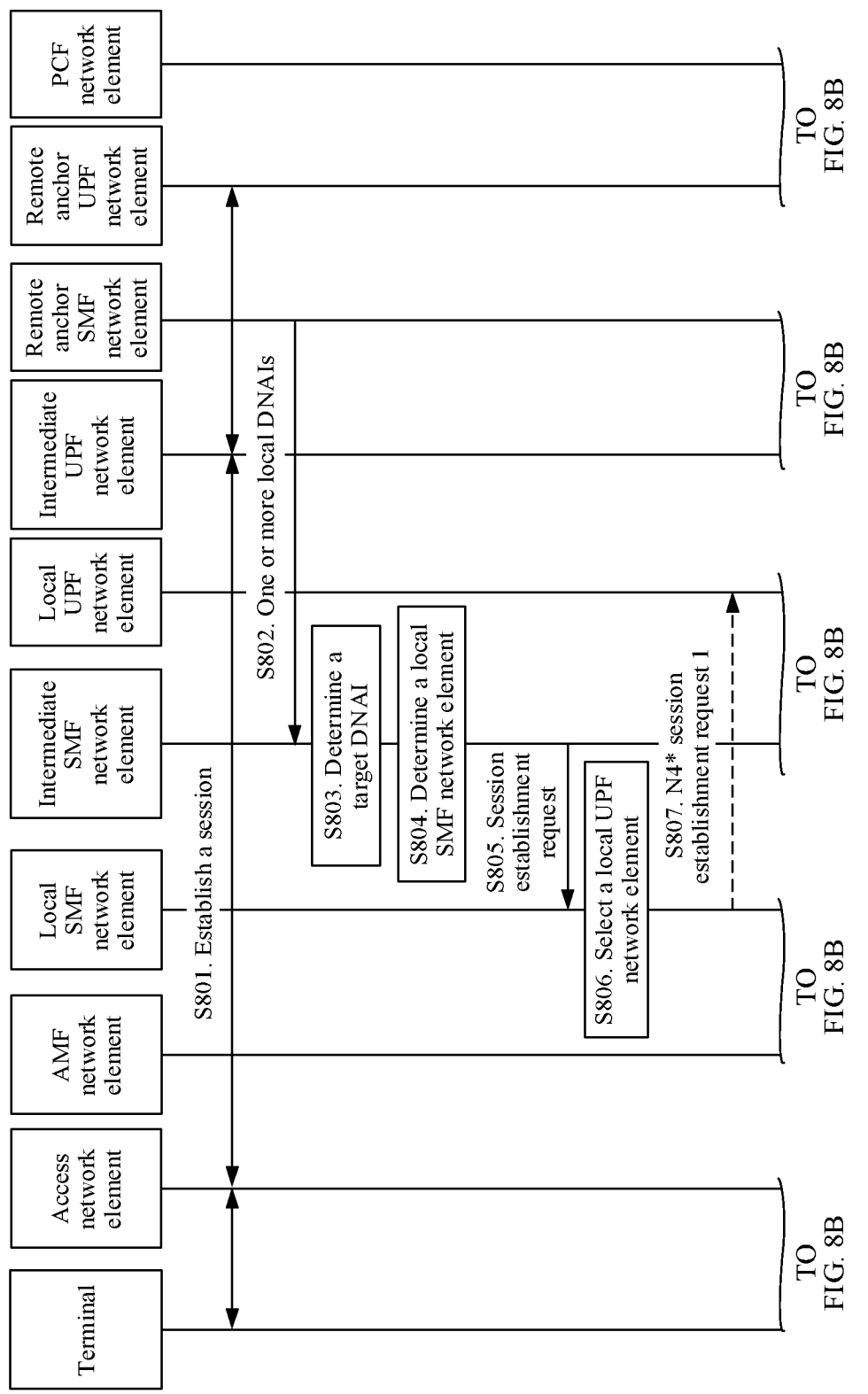
FIG. 8A and FIG. 8B are schematic flowcharts 2 of a session management method according to an embodiment of this application.
Figure 8B:
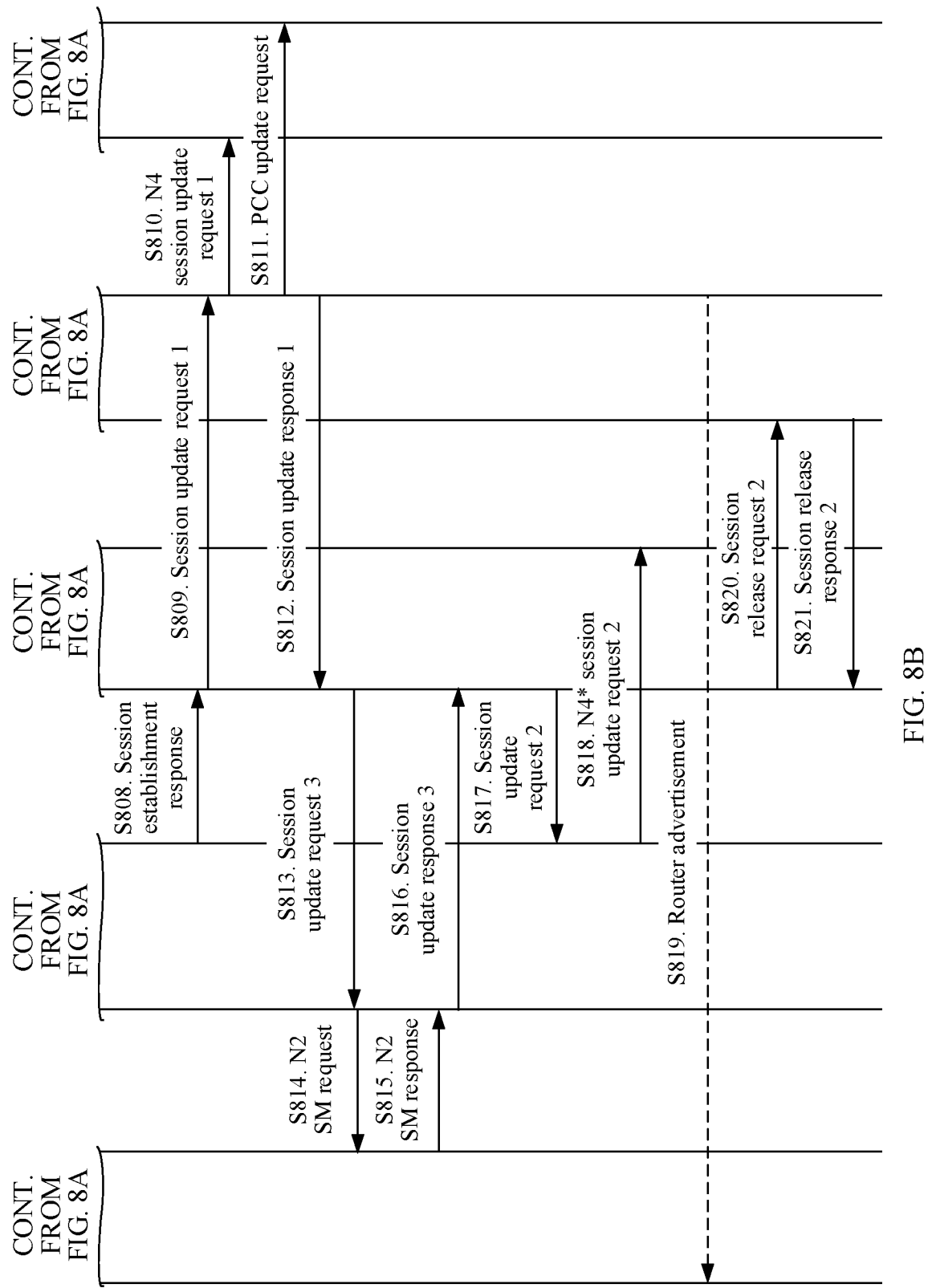

Optionally, for example, the session management system shown in FIG. 4 is applied to the 5G network shown in FIG. 5. FIG. 8A and FIG. 8B show another session management method according to an embodiment of this application. The session management method includes the following steps.

S801. Same as step S701. For details, refer to the embodiment shown in FIG. 7. Details are not described herein again.

S802. Similar to step S702. A difference lies in that, in this embodiment, because there is no interface between a remote anchor SMF network element and a local SMF network element, information about a session access mode and application identification information corresponding to one or more local DNAIs can be sent only by the remote anchor SMF network element to an intermediate SMF network element. However, in the embodiment shown in FIG. 7, after learning of information about the local SMF network element, the remote anchor SMF network element may send the application identification information corresponding to the one or more local DNAIs and the information about the session access mode to the local SMF network element. For related description, refer to the embodiment shown in FIG. 7. Details are not described herein again.

Optionally, in this embodiment of this application, the remote anchor SMF network element may further send a local routing policy corresponding to the one or more local DNAIs to the intermediate SMF network element. This is not specifically limited in this embodiment of this application.

S803. Same as step S703. For related descriptions, refer to the embodiment shown in FIG. 7. Details are not described herein again.

Optionally, in this embodiment of this application, after determining a target DNAI from the one or more local DNAIs, the intermediate SMF network element may generate a target rule based on at least one of the session access mode, a remote IP address, a local routing policy corresponding to the target DNAI, or application identification information corresponding to the target DNAI, where the target rule is used for a local UPF network element to forward a received data packet. This is not specifically limited in this embodiment of this application.

It should be noted that the target rule in this embodiment of this application may also be referred to as a rule installed on the local UPF network element. This is not specifically limited in this embodiment of this application.

Optionally, the local UPF network element in this embodiment of this application may include a local anchor UPF network element and a ULCL/BP. The local anchor UPF network element and the ULCL/BP may be separately deployed, or may be deployed as a whole. This is not specifically limited in this embodiment of this application. The local anchor UPF network element is a UPF network element interfacing with the target DNAI. The ULCL/BP is a UPF network element interfacing with a current access device of a terminal. General description is provided herein, and details are not described below again.

Optionally, if the local anchor UPF network element and the ULCL/BP are separately deployed in this embodiment of this application, the rule installed on the local UPF network element in this embodiment of this application may include at least one of a rule installed on the local anchor UPF network element or a rule installed on the ULCL/BP. General description is provided herein, and details are not described below again.

S804. The intermediate SMF network element determines, based on the target DNAI, the local SMF network element serving the terminal.

Optionally, in this embodiment of this application, the intermediate SMF network element may determine, based on the target DNAI, the local SMF network element serving the terminal by selecting the local SMF network element for the terminal based on the target DNAI and local configuration information.

Alternatively, in this embodiment of this application, that the intermediate SMF network element determines, based on the target DNAI, the local SMF network element serving the terminal may include: requesting, by the intermediate SMF network element, information about the local SMF network element from a network function repository network element, for example, an NRF network element; and after selecting the local SMF network element for the terminal based on the target DNAI, sending, by the NRF network element, the information about the local SMF network element to the intermediate SMF network element.

Alternatively, in this embodiment of this application, that the intermediate SMF network element determines, based on the target DNAI, the local SMF network element serving the terminal may include: requesting, by the intermediate SMF network element, information about the local SMF network element from an AMF network element; and after selecting the local SMF network element for the terminal based on the target DNAI, sending, by the AMF network element, the information about the local SMF network element to the intermediate SMF network element. A manner of determining, by the intermediate network element based on the target DNAI, the local SMF network element serving the terminal is not specifically limited in this embodiment of this application.

Optionally, in this embodiment of this application, if the intermediate SMF network element can further obtain the information about the session access mode, the intermediate SMF network element may further consider the information about the session access mode when determining the local SMF network element serving the terminal. For example, the intermediate SMF network element, the NRF network element, or the AMF network element selects a local SMF network element that supports the session access mode. This is not specifically limited in this embodiment of this application.

S805. Similar to step S706. The only difference lies in that, the AMF network element in the embodiment shown in FIG. 7 is replaced by the intermediate SMF network element in this embodiment of this application. In addition, in this embodiment of this application, the session establishment request may further carry uplink tunnel information of a remote anchor UPF network element. For related descriptions, refer to the embodiment shown in FIG. 7. Details are not described herein again.

Optionally, in this embodiment of this application, if the intermediate SMF network element can obtain the target rule, the session establishment request in step S805 may further carry the target rule. This is not specifically limited in this embodiment of this application.

S806. Same as step S707. For related descriptions, refer to the embodiment shown in FIG. 7. Details are not described herein again.

S807. Similar to step S708. An only difference lies in that, in step S807 in this embodiment, the local SMF network element sends an N4* session establishment request 1 to the local UPF network element, and the N4* session establishment request 1 may further carry the uplink tunnel information of the remote anchor UPF network element in S712. For related descriptions, refer to the embodiment shown in FIG. 7. Details are not described herein again.

Optionally, in this embodiment of this application, if the local SMF network element obtains the target rule in step S805, the N4* session update request 1 in step S807 may further carry the target rule. This is not specifically limited in this embodiment of this application.

S808. The local SMF network element sends a session establishment response to the intermediate SMF network element, and the intermediate SMF network element receives the session establishment response from the local SMF network element.

The session establishment response carries downlink tunnel information of the local UPF network element. For related descriptions of the downlink tunnel information of the local UPF network element, refer to step S709 in the embodiment shown in FIG. 7. Details are not described herein again.

Optionally, if the local SMF network element can obtain the information about the session access mode, and the session access mode corresponding to the information about the session access mode is a multi-homing mode, the session establishment response further carries a local IP address allocated by the local SMF network element to the terminal. This is not specifically limited in this embodiment of this application.

Optionally, if the local SMF network element can obtain the target DNAI, the session establishment response may further carry the target DNAI. The target DNAI is used to perform charging and policy control. This is not specifically limited in this embodiment of this application.

Optionally, in this embodiment of this application, if the downlink tunnel information of the local UPF network element is allocated by the local SMF network element, there is no necessary execution sequence between step S807 and step S808. Step S807 may be performed before or after step S808, or step S807 and step 808 may be performed simultaneously. This is not specifically limited in this embodiment of this application.

S809. Similar to step S709. The only difference lies in that, the local SMF network element in step S709 in the embodiment shown in FIG. 7 is replaced by the intermediate SMF network element in this embodiment of this application. For related descriptions, refer to the embodiment shown in FIG. 7. Details are not described herein again.

S810 and S811. Same as steps S710 and S711. For related descriptions, refer to the embodiment shown in FIG. 7. Details are not described herein again.

S812. The remote anchor SMF network element sends a session update response 1 to the intermediate SMF network element, and the intermediate SMF network element receives the session update response 1 from the remote anchor SMF network element.

Optionally, in this embodiment of this application, if the session access mode is the multi-homing mode, the session update response 1 may further carry a remote IP address allocated by the remote anchor SMF network element to the terminal, where the remote IP address may be used for the intermediate SMF network element or the local SMF network element to generate an uplink offloading rule to be installed on the local UPF network element. When the ULCL and the local anchor UPF network element are deployed as a whole, the uplink offloading rule is used for the local UPF network element to separately send data to a local data network or the remote anchor UPF network element based on a source address of a data packet. When the ULCL and the local anchor UPF network element are separately deployed, the uplink offloading rule includes an uplink offloading rule installed on the ULCL. The uplink offloading rule installed on the ULCL is used for the ULCL to send a data packet to the local anchor UPF network element or the remote anchor UPF network element based on a source address of the data packet. This is not specifically limited in this embodiment of this application.

S813. The intermediate SMF network element sends a session update request 3 to the AMF network element, and the AMF network element receives the session update request 3 from the intermediate SMF network element.

The session update request 3 carries uplink tunnel information of the local UPF network element.

S814 and S815. Same as S714 and step S715. For related descriptions, refer to the embodiment shown in FIG. 7. Details are not described herein again.

S816. The AMF network element sends a session update response 3 to the intermediate SMF network element, and the intermediate SMF network element receives the session update response 3 from the AMF network element.

The session update response 3 carries downlink tunnel information of an access network element.

S817. The intermediate SMF network element sends a session update request 2 to the local SMF network element, and the local SMF network element receives the session update request 2 from the intermediate SMF network element.

The session update request 2 carries the downlink tunnel information of the access network element.

Optionally, in this embodiment of this application, if the intermediate SMF network element can obtain the uplink offloading rule installed on the local UPF network element in step S812, the session update request 2 in step S817 may further carry the uplink offloading rule installed on the local UPF network element. This is not specifically limited in this embodiment of this application.

Optionally, in this embodiment of this application, the intermediate SMF network element may send the remote IP address to the local SMF network element, such that the local SMF network element generates the uplink offloading rule to be installed on the local UPF network element. For related descriptions, refer to step S816. Details are not described herein again.

S818. The local SMF network element sends an N4* session update request 2 to the local UPF network element, and the local UPF network element receives the N4* session update request 2 from the local SMF network element.

The N4* session update request 2 carries the downlink tunnel information of the access network element.

Optionally, in this embodiment of this application, the local UPF network element may further send an N4* session update response 2 corresponding to the N4* session update request 2 to the local SMF network element. This is not specifically limited in this embodiment of this application.

Optionally, in this embodiment of this application, if the local SMF network element can obtain the uplink offloading rule installed on the local UPF network element in step S817, the N4* session update request 2 in step S818 may further carry the uplink offloading rule installed on the local UPF network element. This is not specifically limited in this embodiment of this application.

S819. Same as step S719. For related descriptions, refer to the embodiment shown in FIG. 7. Details are not described herein again.

S820 and S821. Same as steps S721 and S722. For related descriptions, refer to the embodiment shown in FIG. 7. Details are not described herein again.

Based on the session management method provided in this embodiment of this application, the terminal can access the local data network using the local UPF network element even when the terminal is out of the management area of the remote anchor SMF network element.

The actions of the intermediate SMF network element in steps S801 to S821 may be performed by the processor 601 in the communications device 600 shown in FIG. 6 by invoking the application program code stored in the memory 603. This is not limited in this embodiment of this application.

Figure 12A:
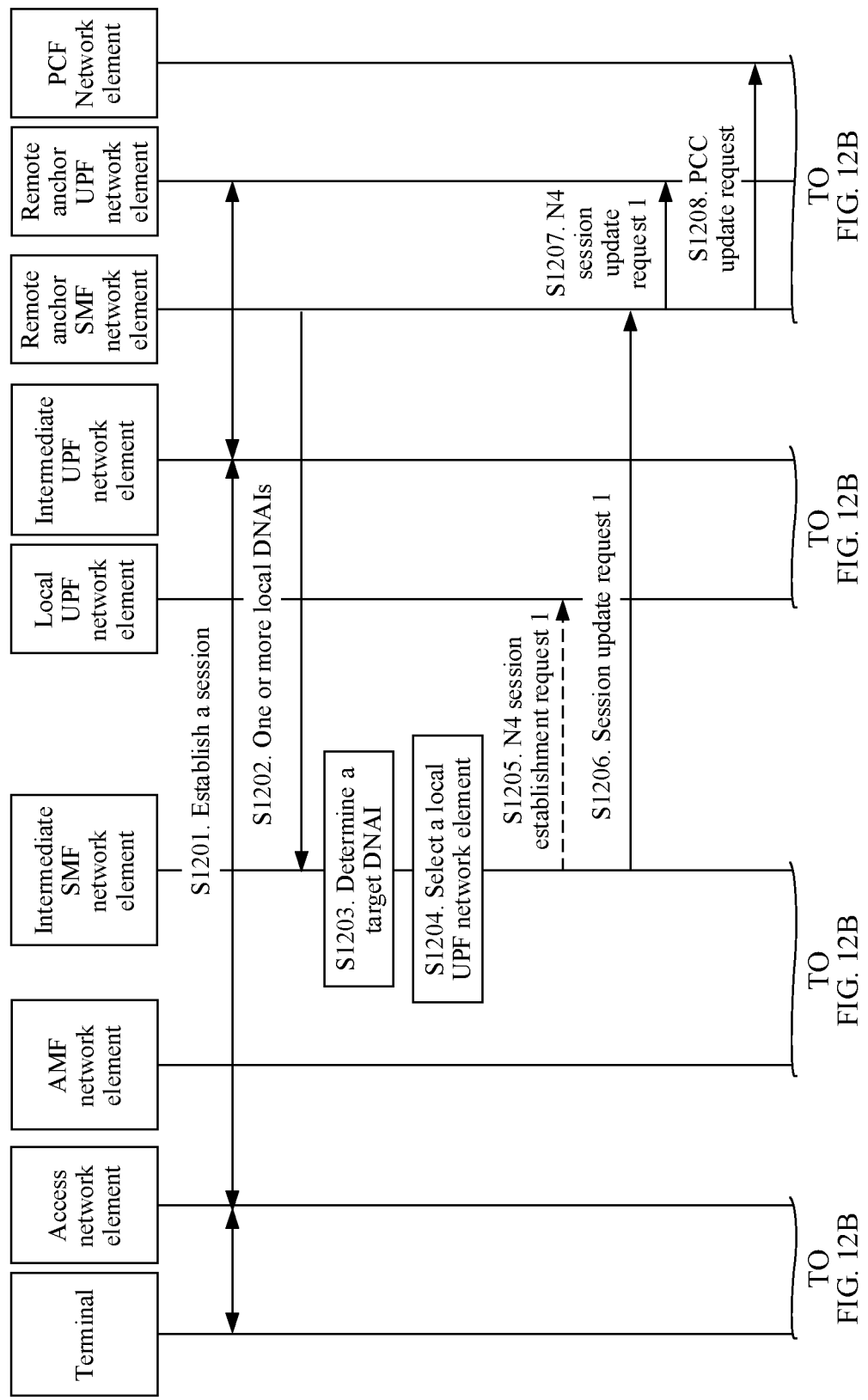
FIG. 12A and FIG. 12B are schematic flowcharts of a session management method according to an embodiment of this application.
Figure 12B:
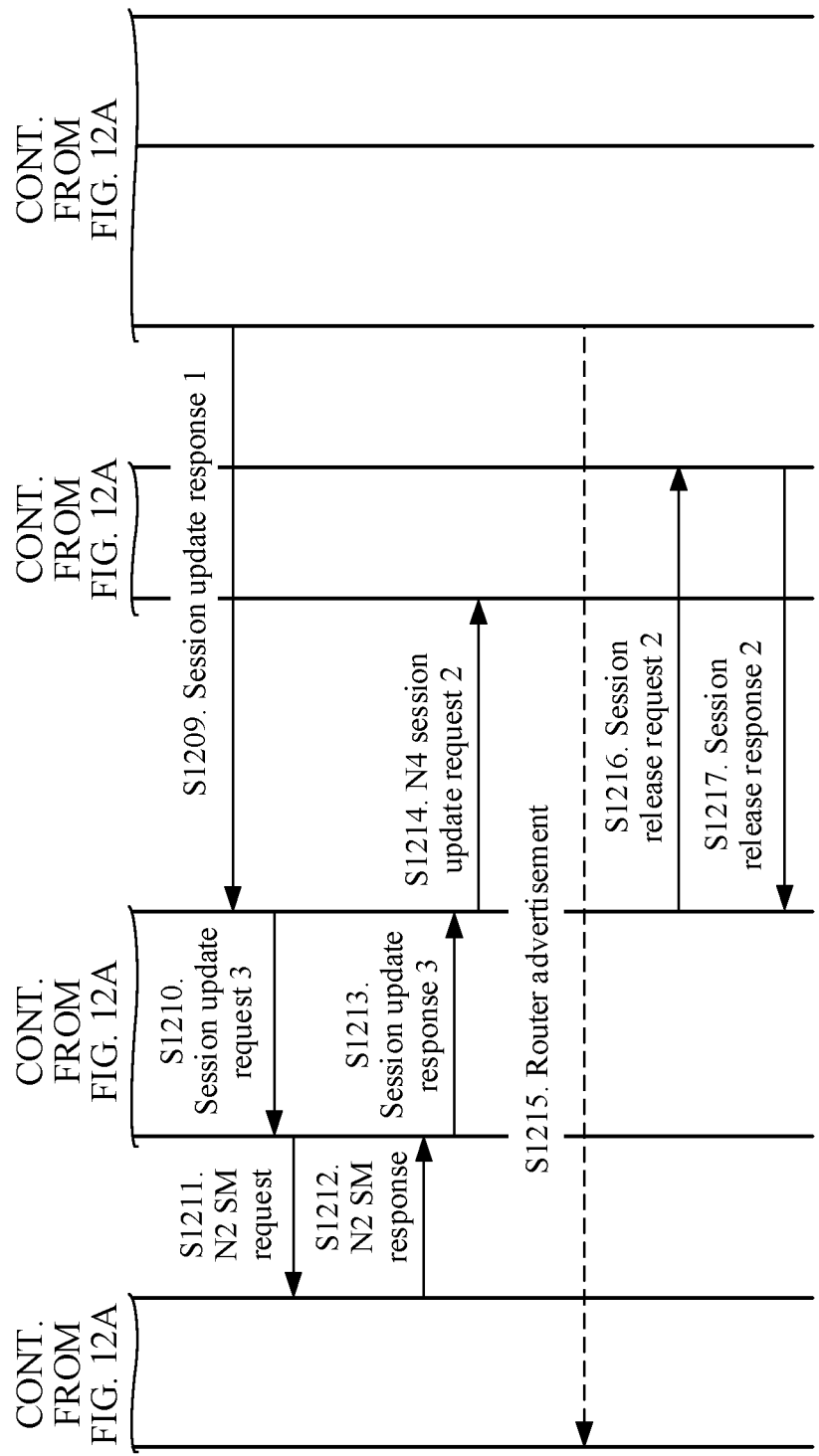

Optionally, for example, the session management system shown in FIG. 10 is applied to the 5G network shown in FIG. 11. FIG. 12A and FIG. 12B show another session management method according to an embodiment of this application. The session management method includes the following steps.

S1201 to S1203. Same as steps S801 to S803. For details, refer to the embodiment shown in FIG. 8A and FIG. 8B. Details are not described herein again.

S1204. An intermediate SMF network element selects a local UPF network element for a terminal based on a target DNAI.

For related descriptions of a local UPF network element, refer to step S803. Details are not described herein again.

If a local anchor UPF network element and a ULCL/BP are separately deployed in this embodiment of this application, an intermediate SMF network element may select a local UPF network element for a terminal based on a target DNAI by: selecting, by the intermediate SMF network element, the local anchor UPF network element for the terminal based on the target DNAI; and selecting, by the intermediate SMF network element, the ULCL/BP for the terminal based on location information of the terminal.

Optionally, in this embodiment of this application, selecting, by the intermediate SMF network element, the local anchor UPF network element for the terminal based on the target DNAI may include: selecting, by the intermediate SMF network element, the local anchor UPF network element for the terminal based on the target DNAI, local configuration information, and optional location information of the terminal; or requesting, by the intermediate SMF network element, information about the local anchor UPF network element from a network function repository network element, for example, an NRF network element; and after selecting the local anchor UPF network element for the terminal based on the target DNAI, sending, by the NRF network element, the information about the local anchor UPF network element to the intermediate SMF network element. This is not specifically limited in this embodiment of this application.

Optionally, in this embodiment of this application, selecting, by the intermediate SMF network element, the ULCL/BP for the terminal based on location information of the terminal may include: selecting, by the intermediate SMF network element, the ULCL/BP for the terminal based on the location information of the terminal and the local configuration information; or requesting, by the intermediate SMF network element, information about the ULCL/BP from the network function repository network element, for example, the NRF network element; and after selecting the ULCL/BP for the terminal based on the location information of the terminal, sending, by the NRF network element, the information about the ULCL/BP to the intermediate SMF network element. This is not specifically limited in this embodiment of this application.

If the local anchor UPF network element and the ULCL/BP are deployed as a whole in this embodiment of this application, that an intermediate SMF network element selects a local UPF network element for a terminal based on a target DNAI may include: selecting, by the intermediate SMF network element, the local UPF network element for the terminal based on the target DNAI, location information of the terminal, and local configuration information; or requesting, by the intermediate SMF network element, information about the local UPF network element from a network function repository network element, for example, an NRF network element; and after selecting the local UPF network element for the terminal based on the target DNAI and the location information of the terminal, sending, by the NRF network element, the information about the local UPF network element to the intermediate SMF network element. This is not specifically limited in this embodiment of this application.

Optionally, if there are a plurality of target DNAIs, the intermediate SMF network element may select different local anchor UPF network elements for different target DNAIs. For example, each target DNAI corresponds to a different local anchor UPF network element.

Assuming that the local anchor UPF network element and the ULCL/BP are deployed as a whole in this embodiment of this application, the session management method provided in this embodiment of this application may further include the following steps.

S1205. Similar to step S807. For example, a difference lies in that, the local SMF network element in step S807 is replaced by the intermediate SMF network element, and the N4* session establishment request 1 in step S807 is replaced by an N4 session establishment request 1. For related descriptions, refer to the embodiment shown in FIG. 8A and FIG. 8B. Details are not described herein again.

S1206 to S1213. Same as steps S809 to 816. For related descriptions, refer to the embodiment shown in FIG. 8A and FIG. 8B. Details are not described herein again.

S1214. Similar to step S818. For example, a difference lies in that, the local SMF network element in step S818 is replaced by the intermediate SMF network element, and the N4* session establishment request 2 in step S818 is replaced by an N4 session establishment request 2. For related descriptions, refer to the embodiment shown in FIG. 8A and FIG. 8B. Details are not described herein again.

S1215. Same as step S819. For related descriptions, refer to the embodiment shown in FIG. 8A and FIG. 8B. Details are not described herein again.

S1216 and S1217. Same as steps S820 to S821. For related descriptions, refer to the embodiment shown in FIG. 8A and FIG. 8B. Details are not described herein again.

Based on the session management method provided in this embodiment of this application, the terminal can access the local data network using the local UPF network element even when the terminal is out of the management area of the remote anchor SMF network element.

The actions of the intermediate SMF network element in steps S1201 to step S1217 may be performed by the processor 601 in the communications device 600 shown in FIG. 6 by invoking the application program code stored in the memory 603. This is not limited in this embodiment of this application.

In the embodiment shown in FIG. 12A and FIG. 12B, an example in which the local anchor UPF network element and the ULCL/BP are deployed as a whole is used for description. Optionally, in this embodiment of this application, alternatively, the local anchor UPF network element and the ULCL/BP may be separately deployed. In this case, the intermediate SMF network element needs to send an N4* session establishment request to each of the local anchor UPF network element and the ULCL/BP, to establish a tunnel between the ULCL/BP and the local anchor UPF network element, and establish a tunnel between the ULCL/BP and the remote anchor UPF network element. For related descriptions, refer to the embodiment shown in FIG. 12A and FIG. 12B. Details are not described herein again.

In conclusion, therefore, an embodiment of this application discloses a session management method, where the method includes: receiving, by an intermediate session management network element, one or more local DNAIs; and determining, by the intermediate session management network element, a target DNAI based on current location information of a terminal and the one or more local DNAIs, where the target DNAI is used to select a local session management network element for the terminal.

In a possible implementation, after determining, by the intermediate session management network element, a target DNAI, the method further includes sending, by the intermediate session management network element, a first message to a mobility management network element, where the first message carries the target DNAI.

In an implementation, the target DNAI is further used to select a local user plane function network element for the terminal.

Optionally, the first message further carries information about a session access mode, and the information about the session access mode is used to determine an access mode of a local session.

In an implementation, the session access mode is further used to select at least one of the local user plane function network element or the local session management network element for the terminal.

In an implementation, the session access mode includes a ULCL mode or a multi-homing mode.

Further, the session management method further includes receiving, by the intermediate session management network element, application identification information corresponding to the one or more local DNAIs. Correspondingly, the first message further carries application identification information corresponding to the target DNAI, where the application identification information corresponding to the target DNAI is used to generate a local routing rule, and the local routing rule is used to offload data to a local data network corresponding to the target DNAI.

Further, after sending, by the intermediate session management network element, a first message to a mobility management network element, the session management method further includes: receiving, by the intermediate session management network element, a second message from the mobility management network element, where the second message is used to notify to release session resources of the terminal on the intermediate session management network element and an intermediate user plane function network element; and releasing, by the intermediate session management network element, a session resource of the terminal on the intermediate session management network element based on the second message, and sending, by the intermediate session management network element, a third message to the intermediate user plane function network element, where the third message is used to notify to release a session resource of the terminal on the intermediate user plane function network element.

In another possible implementation, after determining, by the intermediate session management network element, a target DNAI, the session management method further includes determining, by the intermediate session management network element based on the target DNAI, the local session management network element serving the terminal.

In an implementation, determining, by the intermediate session management network element based on the target DNAI, the local session management network element serving the terminal includes selecting, by the intermediate session management network element, the local session management network element for the terminal based on the target DNAI and local configuration information.

Alternatively, in another implementation, determining, by the intermediate session management network element based on the target DNAI, the local session management network element serving the terminal includes: sending, by the intermediate session management network element, a fourth message to a network function repository network element, where the fourth message carries the target DNAI; receiving, by the intermediate session management network element, information about the local session management network element from the network function repository network element; and determining, by the intermediate session management network element based on the information about the local session management network element, the local session management network element serving the terminal.

Alternatively, in another implementation, determining, by the intermediate session management network element based on the target DNAI, the local session management network element serving the terminal includes selecting, by the intermediate session management network element, the local session management network element for the terminal based on the target DNAI and information about a session access mode.

Alternatively, in another implementation, determining, by the intermediate session management network element based on the target DNAI, the local session management network element serving the terminal includes: sending, by the intermediate session management network element, a fifth message to a mobility management network element, where the fifth message carries the target DNAI; receiving, by the intermediate session management network element, information about the local session management network element from the mobility management network element; and determining, by the intermediate session management network element based on the information about the local session management network element, the local session management network element serving the terminal.

Further, the session management method further includes sending, by the intermediate session management network element, a sixth message to the local session management network element, where the sixth message carries the current location information of the terminal, and the current location information of the terminal is used to select a local user plane function network element for the terminal.

In an implementation, the sixth message further carries the information about the session access mode, and the session access mode information is used to determine an access mode of a local session.

In a possible implementation, the session access mode includes a ULCL mode, and the session management method further includes receiving, by the intermediate session management network element, application identification information corresponding to the one or more local DNAIs. Correspondingly, the sixth message further carries application identification information corresponding to the target DNAI, where the application identification information corresponding to the target DNAI is used to generate a local routing rule, and the local routing rule is used to offload data to a local data network corresponding to the target DNAI.

In another possible implementation, the session access mode includes a multi-homing mode, and the session management method further includes: sending, by the intermediate session management network element to a remote anchor session management network element, a local IP address allocated by the local session management network element to the terminal, where the local IP address is sent to the terminal using the remote anchor session management network element; or sending, by the intermediate session management network element, a router advertisement to the terminal, where the router advertisement carries a local IP address allocated by the local session management network element to the terminal.

Optionally, the session management method further includes sending, by the intermediate session management network element, the target DNAI to the remote anchor session management network element, where the target DNAI is used to perform charging and policy control.

Optionally, the session management method further includes sending, by the intermediate session management network element, a request message to the local session management network element, where the request message is used to establish a path between a current access device of the terminal and the local user plane function network element, and establish a path between the local user plane function network element and a remote anchor user plane function network element.

Further, the session management method further includes sending, by the intermediate session management network element, a seventh message to an intermediate user plane function network element, where the seventh message is used to notify to release a session resource of the terminal on the intermediate user plane function network element.

In the foregoing session management method, for example, for the operations of the intermediate session management network element, refer to the operations of the intermediate SMF network element in FIG. 7 or FIG. 8A and FIG. 8B and the foregoing related written description. Details are not described herein again.

Optionally, an embodiment of this application further discloses a session management method, where the method includes: receiving, by an intermediate session management network element, one or more local data network access identifiers (DNAIs); determining, by the intermediate session management network element, a target DNAI based on current location information of a terminal and the one or more local DNAIs; and selecting, by the intermediate session management network element, a local user plane function network element for the terminal based on the target DNAI.

In an implementation, the session management method provided in this embodiment of this application may further include: obtaining, by the intermediate session management network element, at least one of a session access mode, a remote IP address, a local routing policy corresponding to the target DNAI, or application identification information corresponding to the target DNAI; and generating, by the intermediate session management network element, a target rule based on at least one of the session access mode, the remote IP address, the local routing policy corresponding to the target DNAI, or the application identification information corresponding to the target DNAI, where the target rule is used for the local user plane function network element to forward a received data packet.

In an implementation, the session management method provided in this embodiment of this application may further include sending, by the intermediate session management network element, the target rule to the local user plane function network element.

In an implementation, the session management method provided in this embodiment of this application may further include receiving, by the intermediate session management network element, at least one of the session access mode, the remote IP address, the local routing policy corresponding to the target DNAI, or the application identification information corresponding to the target DNAI from the remote session management network element or a policy control function network element.

In an implementation, the session management method provided in this embodiment of this application may further include obtaining, by the intermediate session management network element, information about a session access mode, where the information about the session access mode is used to determine an access mode of a local session.

Optionally, the session access mode is further used to select the local user plane function network element for the terminal.

Optionally, the session access mode includes an uplink classifier (ULCL) mode or a multi-homing mode.

In an implementation, the session management method provided in this embodiment of this application may further include sending, by the intermediate session management network element, the target DNAI to a remote anchor session management network element, where the target DNAI is used to perform charging and policy control.

In the foregoing session management method, for example, for the operations of the intermediate session management network element, refer to the operations of the intermediate SMF network element in FIG. 12A and FIG. 12B and the foregoing related written description. Details are not described herein again.

The solutions provided in the embodiments of this application are mainly described from the perspective of interaction between network elements. It may be understood that, the intermediate session management network element includes corresponding hardware structures and/or software modules for performing the foregoing functions. A person of ordinary skill in the art should be aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the intermediate session management network element may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that the module division in the embodiments of this application is an example, and is merely logical function division, and there may be other division manners in actual implementation.

Figure 9:
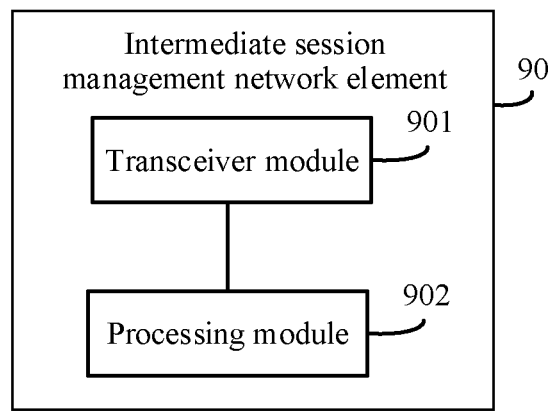
FIG. 9 is a schematic structural diagram of an intermediate session management network element according to an embodiment of this application.

For example, if the functional modules are obtained through division in an integrated manner, FIG. 9 is a schematic structural diagram of an intermediate session management network element 90. The intermediate session management network element 90 includes: a transceiver module 901 and a processing module 902. The transceiver module 901 is configured to receive one or more local DNAIs. The processing module 902 is configured to determine a target DNAI based on current location information of a terminal and the one or more local DNAIs, where the target DNAI is used to select a local session management network element for the terminal.

In a possible implementation, the transceiver module 901 is further configured to send a first message to a mobility management network element, where the first message carries the target DNAI.

Optionally, the transceiver module 901 is further configured to receive application identification information corresponding to the one or more local DNAIs. Correspondingly, the first message further carries application identification information corresponding to the target DNAI, where the application identification information corresponding to the target DNAI is used to generate a local routing rule, and the local routing rule is used to offload data to a local data network corresponding to the target DNAI.

Optionally, the transceiver module 901 is further configured to receive a second message from the mobility management network element, where the second message is used to notify to release session resources of the terminal on the intermediate session management network element and an intermediate user plane function network element. The processing module 902 is further configured to release a session resource of the terminal on the intermediate session management network element based on the second message, and the transceiver module 901 is further configured to send a third message to the intermediate user plane function network element, where the third message is used to notify to release a session resource of the terminal on the intermediate user plane function network element.

In another possible implementation, the processing module 902 is further configured to determine, based on the target DNAI, the local session management network element serving the terminal.

In an implementation, that the processing module 902 is configured to determine, based on the target DNAI, the local session management network element serving the terminal includes the processing module 902 being configured to select the local session management network element for the terminal based on the target DNAI and local configuration information.

In another implementation, that the processing module 902 is configured to determine, based on the target DNAI, the local session management network element serving the terminal includes the processing module 902 being configured to: send a fourth message to a network function repository network element, where the fourth message carries the target DNAI; and receive information about the local session management network element from the network function repository network element.

In another implementation, that the processing module 902 is configured to determine, based on the target DNAI, the local session management network element serving the terminal includes the processing module 902 being configured to select the local session management network element for the terminal based on the target DNAI and information about a session access mode.

In another implementation, that the processing module 902 is configured to determine, based on the target DNAI, the local session management network element serving the terminal includes the processing module 902 being configured to send a fifth message to a mobility management network element, where the fifth message carries the target DNAI; and receive information about the local session management network element from the mobility management network element.

Further, the transceiver module 901 is further configured to send a sixth message to the local session management network element, where the sixth message carries the current location information of the terminal, and the current location information of the terminal is used to select a local user plane function network element for the terminal.

Optionally, the sixth message further carries the information about the session access mode, and the session access mode information is used to determine an access mode of a local session.

In a possible implementation, the session access mode includes a ULCL mode, and the transceiver module 901 is further configured to receive application identification information corresponding to the one or more local DNAIs. Correspondingly, the sixth message further carries application identification information corresponding to the target DNAI, where the application identification information corresponding to the target DNAI is used to generate a local routing rule, and the local routing rule is used to offload data to a local data network corresponding to the target DNAI.

In another possible implementation, the session access mode includes a multi-homing mode, and the transceiver module 901 is further configured to send, to a remote anchor session management network element, a local IP address allocated by the local session management network element to the terminal, where the local IP address is sent to the terminal using the remote anchor session management network element. Alternatively, the transceiver module 901 is further configured to send a router advertisement to the terminal, where the router advertisement carries a local IP address allocated by the local session management network element to the terminal.

Optionally, the transceiver module 901 is further configured to send the target DNAI to the remote anchor session management network element, where the target DNAI is used to perform charging and policy control.

Optionally, the transceiver module 901 is further configured to send a request message to the local session management network element, where the request message is used to establish a path between a current access device of the terminal and the local user plane function network element, and establish a path between the local user plane function network element and a remote anchor user plane function network element.

Optionally, the transceiver module 901 is further configured to send a seventh message to an intermediate user plane function network element, where the seventh message is used to notify to release a session resource of the terminal on the intermediate user plane function network element.

In another possible implementation, optionally, when the intermediate session management network element 90 includes a transceiver module 901 and a processing module 902, the transceiver module 901 is configured to receive one or more local DNAIs, and the processing module 902 is configured to: determine a target DNAI based on current location information of a terminal and the one or more local DNAIs; and select a local user plane function network element for the terminal based on the target DNAI.

Optionally, the processing module 902 is further configured to: obtain at least one of a session access mode, a remote IP address, a local routing policy corresponding to the target DNAI, or application identification information corresponding to the target DNAI; and generate a target rule based on at least one of the session access mode, the remote IP address, the local routing policy corresponding to the target DNAI, or the application identification information corresponding to the target DNAI, where the target rule is used for the local user plane function network element to forward a received data packet.

Optionally, the processing module 902 is further configured to obtain information about a session access mode, where the information about the session access mode is used to determine an access mode of a local session.

Optionally, the one or more DNAIs are a local DNAI supported by the intermediate session management network element in a PCC rule corresponding to one or more service data flows detected by an anchor user plane function network element.

Optionally, the transceiver module 901 is further configured to send a request message to a remote anchor session management network element, where the request message is used to request the remote anchor session management network element to send, to the intermediate session management network element, the local DNAI supported by the intermediate session management network element in the PCC rule corresponding to the one or more service data flows detected by the anchor user plane function network element.

Optionally, that the transceiver module 901 is configured to receive one or more local DNAIs includes the transceiver module 901 being configured to receive one or more local DNAIs from the remote anchor session management network element or a policy control network element.

All related content of the steps in the foregoing method embodiments may be cited in function descriptions of corresponding function modules, and details are not described herein again.

In this embodiment of this application, the intermediate session management network element 90 is presented with the functional modules obtained through division in an integrated manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the intermediate session management network element 90 may be in the form shown in FIG. 5.

For example, the processor 501 in FIG. 5 may invoke the computer executable instruction stored in the memory 503, such that the intermediate session management network element 90 performs the session management methods in the foregoing method embodiments.

In an embodiment, the functions/implementation processes of the transceiver module 901 and the processing module 902 in FIG. 9 may be implemented by the processor 501 in FIG. 5 by invoking the computer executable instruction stored in the memory 503. Alternatively, the function/implementation process of the processing module 902 in FIG. 9 may be implemented by the processor 501 in FIG. 5 by invoking the computer executable instruction stored in the memory 503, and the function/implementation process of the transceiver module 901 in FIG. 9 may be implemented by the communications interface 503 in FIG. 5.

The intermediate session management network element provided in this embodiment of this application can perform the foregoing session management method. Therefore, for a technical effect that can be achieved by the intermediate session management network element, refer to the foregoing method embodiment. Details are not described herein again.

Optionally, an embodiment of this application provides a chip system. The chip system includes a processor, configured to support an intermediate session management network element in implementing the session management method, for example, determining a target DNAI based on current location information of a terminal and one or more local DNAIs. In a possible design, the chip system further includes a memory. The memory is configured to store a program instruction and data that are necessary for the intermediate session management network element. Certainly, alternatively, the memory may not be in the chip system. The chip system may include a chip, or may include a chip and another discrete device. This is not specifically limited in this embodiment of this application.

All or some of the embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to example features and the embodiments thereof, various modifications and combinations may be made to them without departing from the spirit and scope of this application. Correspondingly, the specification and accompanying drawings are merely example descriptions of this application defined by the appended claims, and are considered as any or all of modifications, variations, combinations, or equivalents that cover the scope of this application. Persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session management method comprising:
   receiving, by an intermediate session management network element from a remote anchor session management network element, one or more local data network access identifiers (DNAIs);
   determining, by the intermediate session management network element, a target DNAI based on current location information of a terminal and the one or more local DNAIs;
   selecting, by the intermediate session management network element, a local user plane function network element for the terminal based on the target DNAI; and
   sending, by the intermediate session management network element and to the remote anchor session management network element, the target DNAI for determining a first policy and charging control (PCC) rule for the local user plane function network element.

2. The session management method of claim 1, wherein the one or more local DNAIs correspond to a session of the terminal, wherein the one or more local DNAIs are supported by the intermediate session management network element, and wherein the one or more local DNAIs are from a second PCC rule.

3. The session management method of claim 1, further comprising:
   obtaining, by the intermediate session management network element from the remote anchor session management network element, information about a session access mode;
   determining, by the intermediate session management network element based on the information, that the session access mode is a multi-homing mode; and
   sending, by the intermediate session management network element to the remote anchor session management network element, local Internet Protocol (IP) address information of the terminal.

4. The session management method of claim 1, further comprising:
   obtaining, by the intermediate session management network element, application identification information corresponding to the target DNAI; and
   generating, by the intermediate session management network element based on the application identification information, a target rule instructing the local user plane function network element to forward a received data packet.

5. The session management method of claim 1, further comprising instructing the local user plane function network element to offload a data packet to a local data network corresponding to the target DNAI, wherein the data packet comprises a source address that is a local Internet Protocol (IP) address.

6. The session management method of claim 1, further comprising:

obtaining, by the intermediate session management network element, remote Internet Protocol (IP) address information; and generating, by the intermediate session management network element based on the remote IP address information, a target rule instructing the local user plane function network element to forward a received data packet.

7. The session management method of claim 1, further comprising instructing, by the intermediate session management network element, the local user plane function network element to offload a data packet to a remote anchor user plane function network element, wherein the data packet comprises a source address that is a remote Internet Protocol (IP) address.

8. The session management method of claim 7, wherein instructing, by the intermediate session management network element, the local user plane function network element comprises sending, to the local user plane function network element, a remote routing rule to offload the data packet to the remote anchor user plane function network element.

9. An intermediate session management network element comprising:
a memory configured to store instructions; and
a processor coupled to the memory and configured to execute the instructions to cause the intermediate session management network element to:
receive, from a remote anchor session management network element, one or more local data network access identifiers (DNAIs);
determine a target DNAI based on current location information of a terminal and the one or more local DNAIs;
select a local user plane function network element for the terminal based on the target DNAI; and
send, to the remote anchor session management network element, the target DNAI for determining a first policy and charging control (PCC) rule for the local user plane function network element.

10. The intermediate session management network element of claim 9, wherein the one or more local DNAIs correspond to a session of the terminal, wherein the one or more local DNAIs are supported by the intermediate session management network element, and wherein the one or more local DNAIs are from a second rule.

11. The intermediate session management network element of claim 9, wherein the processor is further configured to execute the instructions to cause the intermediate session management network element to:
obtain, from the remote anchor session management network element, information about a session access mode;
determine, based on the information, that the session access mode is a multi-homing mode; and
send, to the remote anchor session management network element, local Internet Protocol (IP) address information of the terminal.

12. The intermediate session management network element of claim 9, wherein the processor is further configured to execute the instructions to cause the intermediate session management network element to:
obtain application identification information corresponding to the target DNAI; and
generate, based on the application identification information, a target rule instructing the local user plane function network element to forward a received data packet.

13. The intermediate session management network element of claim 9, wherein the processor is further configured to execute the instructions to cause the intermediate session management network element to instruct the local user plane function network element to offload a data packet to a local data network corresponding to the target DNAI, and wherein the data packet comprises a source address that is a local Internet Protocol (IP) address.

14. The intermediate session management network element of claim 9, wherein the processor is further configured to execute the instructions to cause the intermediate session management network element to:
obtain remote Internet Protocol (IP) address information; and
generate, based on the remote IP address information, a target rule instructing the local user plane function network element to forward a received data packet.

15. The intermediate session management network element of claim 9, wherein the processor is further configured to execute the instructions to cause the intermediate session management network element to instruct the local user plane function network element to offload a data packet to a remote anchor user plane function network element, and wherein the data packet comprises a source address that is a remote Internet Protocol (IP) address.

16. The intermediate session management network element of claim 15, wherein the processor is further configured to execute the instructions to cause the intermediate session management network element to instruct the local user plane function network element by sending, to the local user plane function network element, a remote routing rule to offload the data packet to the remote anchor user plane function network element.

17. A computer program product comprising instructions that are stored on a non-transitory computer-readable medium and that, when executed by a processor, cause an intermediate session management network element to:
receive, from a remote anchor session management network element, one or more local data network access identifiers (DNAIs);
determine a target DNAI based on current location information of a terminal and the one or more local DNAIs;
select a local user plane function network element for the terminal based on the target DNAI; and
send, to the remote anchor session management network element, the target DNAI for determining a first policy and charging control (PCC) rule for the local user plane function network element.

18. The computer program product of claim 17, wherein the one or more local DNAIs correspond to a session of the terminal, wherein the one or more local DNAIs are supported by the intermediate session management network element, and wherein the one or more local DNAIs are from a second rule.

19. The computer program product of to claim 17, wherein the instructions, when executed by the processor, further cause the intermediate session management network element to:
obtain, from the remote anchor session management network element, information about a session access mode;
determine, based on the information about the session access mode, that the session access mode is a multi-homing mode; and
send, to the remote anchor session management network element, local Internet Protocol (IP) address information of the terminal.

20. The computer program product of claim 17, wherein the instructions, when executed by the processor, further cause the intermediate session management network element to:
- obtain remote Internet Protocol (IP) address information; and
- generate, based on the remote IP address information, a target rule instructing the local user plane function network element to forward a received data packet.

21. The computer program product of claim 17, wherein the instructions, when executed by the processor, further cause the intermediate session management network element to instruct the local user plane function network element to offload a data packet to a remote anchor user plane function network element, and wherein the data packet comprises a source address that is a remote Internet Protocol (IP) address.

22. The computer program product of claim 21, wherein the instructions, when executed by the processor, further cause the intermediate session management network element to instruct the local user plane function network element by sending, to the local user plane function network element, a remote routing rule to offload the data packet to the remote anchor user plane function network element.

* * * * *